(12) United States Patent
Fuse

(10) Patent No.: US 6,512,619 B1
(45) Date of Patent: Jan. 28, 2003

(54) FREQUENCY MODULATION APPARATUS

(75) Inventor: Masaru Fuse, Toyonaka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/484,265

(22) Filed: Jan. 18, 2000

(30) Foreign Application Priority Data

Jan. 19, 1999 (JP) .......................................... 11-010143

(51) Int. Cl.$^7$ ............................................... H04B 10/12
(52) U.S. Cl. ........................ 359/173; 359/180; 359/181; 359/182; 359/188; 359/189; 359/191; 359/193; 359/195; 359/237; 359/278
(58) Field of Search ................................. 359/173, 180, 359/181, 182, 188, 189, 191, 193, 195, 237, 238, 278

(56) References Cited

U.S. PATENT DOCUMENTS

| | | | | |
|---|---|---|---|---|
| 5,768,449 A | * | 6/1998 | Fuse et al. ..................... | 385/1 |
| 5,896,216 A | * | 4/1999 | Kikushima et al. ......... | 359/182 |
| 5,923,458 A | * | 7/1999 | Fuse et al. ................... | 359/278 |
| 5,973,820 A | * | 10/1999 | Fuse et al. ................... | 359/278 |
| 6,335,814 B1 | * | 1/2002 | Fuse et al. ................... | 359/182 |

OTHER PUBLICATIONS

"Optical Super Wide–Band FM Modulation Scheme and Its Application to Multi–Channel AM Video Transmission Systems" by K. Kikushima et al., IOOC 1995 Technical Digest, vol. 5, PD 2–7, pp. 33–34.

"CNR Characteristics of Analog/Digital Hybrid Transmission System employing Super Wide–band FM Technique" by M. Fuse et al., ECOC 97, Sep. 22–25, 1997, Conference Publication No. 448.

* cited by examiner

Primary Examiner—Leslie Pascal
Assistant Examiner—Hanh Phan
(74) Attorney, Agent, or Firm—Wenderoth, Lind & Ponack, L.L.P.

(57) ABSTRACT

A first optical modulator converts an electrical signal into an optical-frequency-modulated signal, supplying the same with unmodulated light from a local light source to a first optical receiver. The first optical receiver generates an FM signal, which is a beat signal between the received two lights. This, FM signal is supplied to a filter, where only the carrier component thereof is extracted, and the carrier component is converted in frequency in the frequency converter. With the resultant signal after frequency conversion, a second optical modulator optically modulates the amplitude or intensity of the unmodulated light from the local light source. A second optical receiver receives the resultant signal after optical modulation and an optical signal from the first optical modulator, producing an FM signal, which is a beat signal between the received two optical signals. With such configuration, it is possible to realize high-frequency, wide-band frequency modulation, and also to suppress the phase noise included in the FM signal.

12 Claims, 14 Drawing Sheets

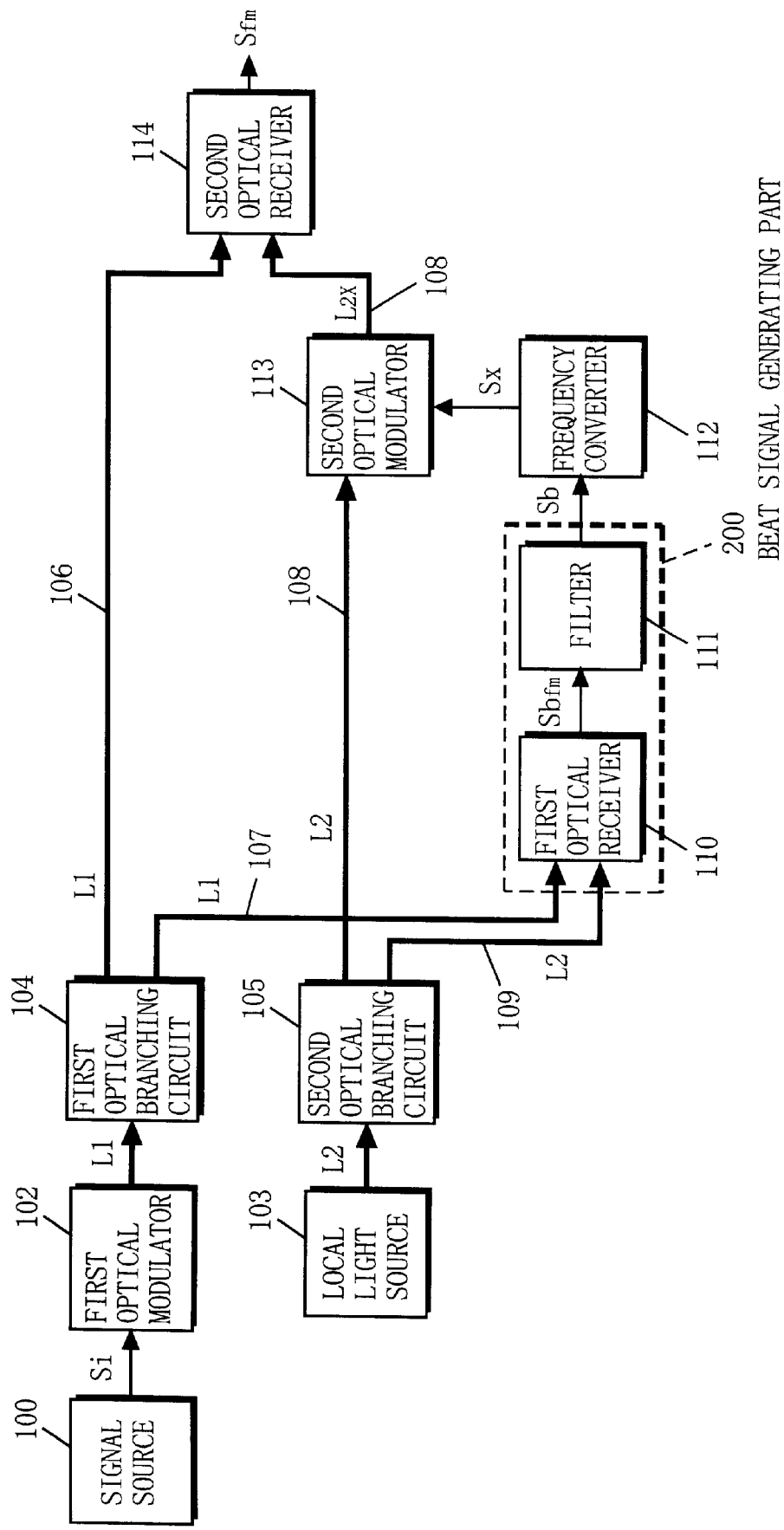

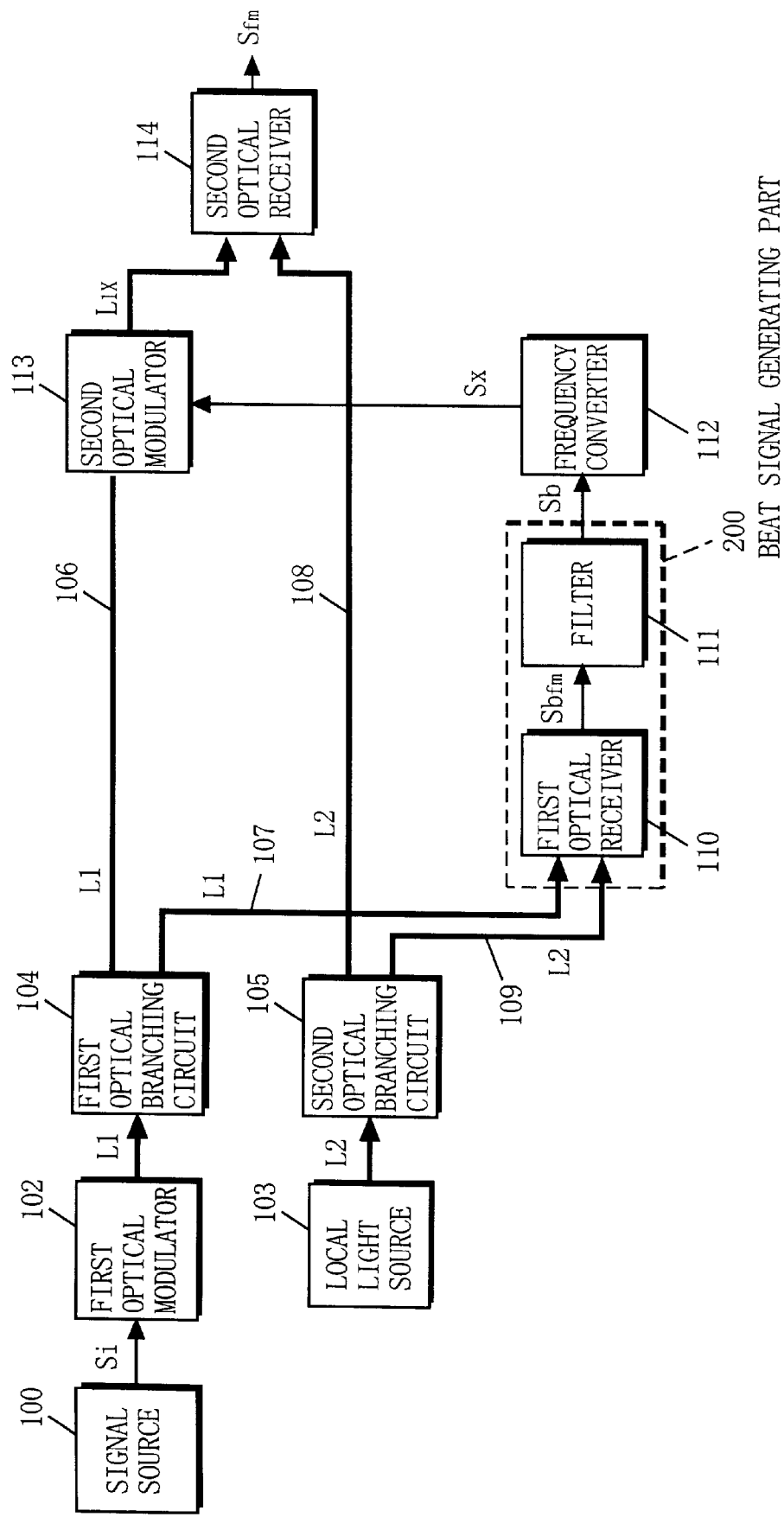

FREQUENCY MODULATION APPARATUS

BACKGROUND OF THE INVENTION

1. Field of the Invention

The present invention relates to a modulation apparatus for generating a wide-band frequency modulated signal (hereinafter referred to as FM signal) through an optical frequency modulation scheme of a semiconductor laser and an optical heterodyne detection technique.

2. Description of the Background Art

FIG. 14 is a block diagram showing the configuration of a conventional modulation apparatus. Operation of such frequency modulation apparatus is described in detail in documents such as "Optical Super Wide-Band FM Modulation Scheme and Its Application to Multi-Channel AM Video Transmission Systems", K. Kikushima, et al, IOOC 1995 Technical Digest, Vol. 5 PD2–7, pp. 33–34, which is incorporated herein by reference. The frequency modulation apparatus shown in FIG. 14 includes a signal source 700, an optical modulator 702, a local light source 703, a first optical waveguide 706, a second optical waveguide 708, and an optical receiver 714.

In the above frequency modulation apparatus, the signal source 700 produces an electrical signal Si, which is an original signal for FM modulation. The optical modulator 702 is constructed of, for example, a semiconductor laser. In general, the semiconductor laser emits light having a constant optical frequency $f_1$, provided that an injection current is constant. When the injection current is amplitude-modulated, the optical frequency is also subjected to modulation, and the semiconductor laser emits an optical-frequency-modulated signal centering on the optical frequency $f_1$. With this characteristic, the optical modulator 702 converts the electrical signal Si supplied from the signal source 700 into an optical-frequency-modulated signal L1. The local light source 703 produces an unmodulated light L2 having a constant optical frequency $f_2$. The lights L1 and L2 are supplied to the optical receiver 714 through the first and second optical waveguides 706 and 708, respectively. The optical receiver 714 is constructed of a photodiode having square-law detection characteristics, for example, producing a beat signal of the supplied two lights L1 and L2 at a frequency $f_s$ equal to the optical frequency difference $|f_1-f_2|$ between the two optical signals L1 and L2 (this operation is called optical heterodyne detection). The beat signal obtained in the above described manner is outputted as a frequency-modulated signal Sfm whose original signal is the electrical signal Si from the signal source 700.

As described above, with the use of high frequency modulation efficiency of the semiconductor laser (more than ten times the frequency modulation efficiency in ordinary electric circuit systems), the conventional frequency modulation apparatus shown in FIG. 14 can easily generate an extremely high-frequency, wide-band FM signal with large frequency deviation, which is difficult to be produced in the ordinary electric circuit.

However, light sources such as semiconductor lasers generally have large phase noise, compared with electric oscillators. Therefore, the above conventional modulation apparatus has a unique problem that white noise components increase at demodulation of the FM signal. More specifically, when the optical-frequency-modulated signal L1 from the optical modulator 702 and the unmodulated light L2 from the local light source 703 have frequency spectrums as shown in FIG. 15A, the frequency spectrum of the FM signal Sfm outputted from the optical receiver 714 becomes as such shown in FIG. 15B. As shown in FIGS. 15A and 15B, the phase noise included in the FM signal Sfm becomes the sum of the phase noises included in the optical-frequency-modulated signal L1 and the unmodulated light L2. Therefore, the white noise components increase when the FM signal is demodulated.

SUMMARY OF THE INVENTION

Therefore, an object of the present invention is to provide a frequency modulation apparatus capable of realizing high-frequency, wide-band frequency modulation and suppressing phase noise included in the frequency-modulated signal, with a combination of optical frequency modulation of a semiconductor laser and optical heterodyne detection.

The present invention has the following features to achieve the object above.

A first aspect of the present invention is directed to a frequency modulation apparatus for converting an input electrical signal into an FM signal through optical frequency modulation and optical heterodyne detection using a first light source emitting first light and a second light source emitting second light, the first light and the second light having different optical frequencies from each other; the apparatus comprising:

a first optical modulator for outputting the first light frequency-modulated with the input electrical signal as a first optical signal;

a beat signal generating part for generating an unmodulated beat signal corresponding to a carrier component of a beat signal obtained from the first and second lights through optical detection based on a square-law detection characteristic;

a frequency converter for generating the frequency-converted signal by converting frequency of the unmodulated beat signal;

a second optical modulator for generating a second optical signal by optical-amplitude-modulating or optical-intensity-modulating any one of the first optical signal and the second light with the frequency-converted signal; and an optical receiver for receiving one of the first optical signal and the second light, which is not subjected to optical-amplitude-modulation or optical-intensity-modulation by the second optical modulator, and the second optical signal, and generating the FM signal through optical detection based on the square-law detection characteristic.

In the first aspect, two light sources (the first and second light sources) and two square-law detectors (the beat signal generating part and the optical receiver) constitute two optical heterodyne systems. A first optical heterodyne system is constructed of the first optical modulator corresponding to the first light source, the second light source as a local light source, and the beat signal generating part. A second optical heterodyne system is constructed of the first optical modulator, the second light source (local light source), and the optical receiver. With the frequency-converted signal obtained by converting the frequency of the carrier component (center frequency component) of the beat signal generated in the first optical heterodyne system, one of the two lights in the second optical heterodyne system is amplitude-modulated or intensity-modulated. Thus, the frequency modulation apparatus of the first aspect can suppress the phase noise of the FM signal, which is a beat signal generated in the second optical heterodyne system, realizing frequency modulation with low noise.

According to a second aspect, in the first aspect,
the first optical modulator generates the first optical signal through direct modulation; and
the beat signal generating part comprises
    a photo-detection device for receiving the first optical signal and the second light, and generating a modulated beat signal, which is a modulated electrical signal having a center frequency equal to a difference of optical frequencies between the first optical signal and the second light, through optical detection based on the square-law detection characteristic; and
    a filter for extracting a carrier component from the modulated beat signal, and outputting the carrier component as the unmodulated beat signal.

In the second aspect, the first optical signal is generated through direct modulation. Then, an unmodulated beat signal, which is the carrier component, is extracted by the filter from the modulated beat signal generated from the first optical signal and second light. With the frequency-convert signal obtained by converting the frequency of the unmodulated beat signal, one of two lights in the second optical heterodyne system is amplitude-modulated or intensity-modulated. Thus, the frequency modulation apparatus of the second aspect can suppress the phase noise of the FM signal generated by the optical receiver, realizing frequency modulation with low noise.

According to a third aspect, in the first aspect,
the first optical modulator comprises
    the first light source for emitting the first light as being unmodulated; and
    an external optical modulator for generating the first optical signal by modulating the first light emitted from the first light source with the input electrical signal;
the second light source emits second light as being unmodulated; and
the beat signal generating part comprises a photo-detection device for receiving the first and second lights, and generating the unmodulated beat signal through optical detection based on the square-law detection characteristic.

In the third aspect, the first light is converted through external modulation into the first optical signal, which is a modulated light. In the beat signal generating part, an unmodulated beat signal is generated from the first and second lights, which are both unmodulated lights. Therefore, no filter for extracting a carrier component from the modulated beat signal is required.

According to a fourth aspect, in the first aspect,
the first optical modulator generates the first optical signal having a predetermined center frequency $f_1$, by uniquely converting an amplitude variation of the input electrical signal into an optical frequency variation of the first light,
the second light source emits light having a predetermined frequency $f_2$ as the second light,
the beat signal generating part comprises
    a photo-detection device for receiving the first optical signal and the second light, and generating a modulated beat signal, which is a modulated electrical signal, at a frequency $f_s=|f_1-f_2|$ equal to a difference of optical frequencies between the first optical signal and the second light through the optical detection based on the square-law detection characteristic; and
    a filter for extracting a carrier component from the modulated beat signal, and outputting the carrier component as the unmodulated beat signal,
the frequency converter converts the unmodulated beat signal into a signal having a predetermined frequency $f_x$, and outputting the converted signal as the frequency-converted signal,
the second optical modulator generates a second optical signal by optical-amplitude-modulating or optical-intensity-modulating any one of the first optical signal and the second light with the frequency-converted signal having the frequency $f_x$, and
the optical receiver receives one of the first optical signal and the second light, which is not subjected to optical-amplitude-modulation or optical-intensity-modulation by the second optical modulator, and the second optical signal, generating the FM signal at a frequency $f_L=|f_s-f_x|$ through optical detection based on the square-law detection characteristic.

In the fourth aspect, the input electrical signal is converted into an optical-frequency-modulated signal by the first optical modulator. In the above-described first optical heterodyne system, the carrier component, which is the unmodulated beat signal outputted from the beat signal generating part, is frequency-converted. In the above-described second optical heterodyne system, the light signal from the first optical modulator or the light from the second light source is amplitude-modulated or intensity-modulated with the frequency-converted carrier component. Thus, the frequency modulation apparatus of the fourth aspect can suppress the phase noise of the FM signal, which is a beat signal outputted from the optical receiver, realizing frequency modulation with low noise characteristics.

According to a fifth aspect, in the first aspect,
the frequency modulation apparatus further comprises
    a branching circuit for branching the input electrical signal into first and second electrical signals with opposite phases; and
    a third optical modulator for converting the second electrical signal into a third optical signal through optical intensity modulation,
the first optical modulator generates the first optical signal having a predetermined center frequency $f_1$ by uniquely converting an amplitude variation of the first electrical signal into an optical frequency variation of the first light through direct modulation,
the second light source emits light having a predetermined frequency $f_2$ as the second light,
the beat signal generating part comprises:
    a photo-detection device for receiving the first optical signal and the second light, and generating a modulated beat signal, which is a modulated electrical signal, at a frequency $f_s=|f_1-f_2|$ equal to a difference of optical frequencies between the first optical signal and the second light through optical detection based on the square-law detection characteristic; and
    a filter for extracting a carrier component from the modulated beat signal, and outputting the carrier component as the unmodulated beat signal,
the frequency converter converts the unmodulated beat signal into a signal having a predetermined frequency $f_x$, and outputs the signal as the frequency-converted signal,
the second optical modulator generates a second optical signal by optical-amplitude-modulating or optical-intensity-modulating any one of the first optical signal and the second light with the frequency-converted signal having the frequency $f_x$, and
the optical receiver receives one of the first optical signal and the second light, which is not subjected to opticalamplitude-modulation or optical-intensity-modulation by the second optical modulator, and the second optical signal, generating the FM signal at a frequency $f_L=|f_s-f_x|$ through the optical detection based on the square-law detection characteristic, and also receives the third optical signal, generating an electrical signal corresponding to an optical-intensity-modulated component included in the third optical signal through the optical detection.

In the fifth aspect, the input electrical signal, which is an original signal for frequency modulation, is branched into first and second electrical signals of opposite phase. The first electrical signal is then converted by the first optical modulator into a first optical signal, which is an optical-frequency-modulated signal. In the above-described first optical heterodyne system, the carrier component, which is an unmodulated beat signal outputted from the beat signal generating part, is frequency-converted. In the above-described second optical heterodyne system, the optical signal from the first optical modulator or the light from the second light source is amplitude-modulated or intensity-modulated with the frequency-converted carrier component. Furthermore, the second electrical signal is converted by the third optical modulator into a third optical signal, which is an optical-intensity-modulated signal, and then supplied to the optical receiver. In the optical receiver, an intensity-modulation-direct-detection component (IM-DD component) is generated through square-law detection. This IM-DD component cancels out an IM-DD component corresponding to an optical-intensity-modulated component (generated due to direct modulation) included in the first optical signal. Thus, the frequency modulation apparatus of the fifth aspect can suppress the phase noise of the FM signal, which is a beat signal outputted from the optical receiver, realizing frequency modulation of high quality with undesired components reduced.

According to a sixth aspect, in the fifth aspect,
the frequency modulation apparatus further comprises a phase/amplitude adjusting part for adjusting a first IM-DD component and a second IM-DD component to have opposite phases and a same amplitude, the first IM-DD component corresponding to an optical-intensity-modulated component included in the first optical signal and the second IM-DD component corresponding to an optical-intensity-modulated component included in the third optical signal, the first and second IM-DD components being generated by the optical receiver through optical detection based on the square-law detection characteristic.

In the sixth aspect, the first IM-DD component corresponding to an optical-intensity-modulated component included in the first optical signal and the second IM-DD component corresponding to an optical-intensity-modulated component included in the third optical signal are adjusted to have opposite phases and the same amplitude. Thus, the frequency modulation apparatus of the sixth aspect can more surely suppress the IM-DD components outputted from the optical receiver, generating high-frequency, wide-band FM signal of higher quality.

According to a seventh aspect, in the first aspect,
the frequency modulation apparatus further comprises:
a branching circuit for branching the input electrical signal into the first and second electrical signals having opposite phases to each other; and
a fourth optical modulator for outputting the second light, which is a modulated light having a predetermined center frequency $f_2$, as a fourth optical signal, the first optical modulator generates the first optical signal having a predetermined center frequency $f_1$ by uniquely converting an amplitude variation of the first electrical signal into an optical frequency variation of the first light through direct modulation, the fourth optical modulator generates the fourth optical signal having the predetermined center frequency $f_2$ by uniquely converting an amplitude variation of the second electrical signal into an optical frequency variation of the second light by direct modulation, the beat signal generating part comprises
a photo-detection device for receiving the first and fourth optical signals, and generating a modulated electrical beat signal at a frequency $f_s=|f_1-f_2|$ equal to a difference of optical frequencies between the first and fourth optical signals through optical detection based on the square-law detection characteristic; and
a filter for extracting a carrier component from the modulated beat signal, and outputting the carrier component as the unmodulated beat signal, the frequency converter converts the unmodulated beat signal into a signal having a predetermined frequency $f_x$, and outputs the converted signal as the frequency-converted signal, the second optical modulator generates the second optical signal by optical-amplitude-modulating or optical-intensity-modulating any one of the first and fourth optical signals with the frequency-converted signal, and the optical receiver receives one of the first and fourth optical signals, which is not subjected to optical-amplitude-modulation or optical-intensity-modulation by the second optical modulator, and the second optical signal, generating the FM signal at a frequency $f_L=|f_s-f_x|$ through optical detection based on the square-law detection characteristic.

In the seventh aspect, the input electrical signal, which is an original signal for frequency modulation, is branched into first and second electrical signals of opposite phase. The first electrical signal is converted through direct modulation in the first optical modulator into a first optical signal, which is an optical-frequency-modulated signal. The second electrical signal is converted through direct modulation in the fourth optical modulator into a fourth optical signal, which is an optical-frequency-modulated signal. The present frequency modulation apparatus constitutes two optical heterodyne systems. A first optical heterodyne system is constructed of the first optical modulator, the fourth optical modulator, and the beat signal generating part. A second optical heterodyne system is constructed of the first optical modulator, the fourth optical modulator, and the optical receiver. In the first heterodyne system, the carrier component, which is an unmodulated beat signal outputted from the beat signal generating part, is frequency-converted. In the second heterodyne system, the optical signal outputted from the first or fourth optical modulator is amplitude-modulated or intensity-modulated with the frequency-converted carrier component. Thus, the frequency modulation apparatus of the seventh aspect can suppress the phase noise of the FM signal, which is a beat signal outputted from the optical receiver, realizing frequency modulation with low noise. Furthermore, as described above, the frequency-modulated signal is generated by push-pull operation of the first and fourth optical modulator, canceling out an undesired IM-DD component caused due to optical-intensity-modulated component generated in direct modulation. This enables frequency modulation of high quality with undesired components reduced.

According to an eighth aspect, in the seventh aspect,
the frequency modulation apparatus further comprises a phase/amplitude adjusting part for adjusting a first IM-DD component and a third IM-DD component to have opposite phases and a same amplitude, the first IM-DD component corresponding to an optical-intensity-modulated component included in the first optical signal and the third IM-DD component corresponding to an optical-intensity-modulated component included in the fourth optical signal, the first and third IM-DD components being generated by the optical receiver through optical detection based on the square-law detection characteristic.

In the eighth aspect, the first IM-DD component corresponding to an optical-intensity-modulated component included in the first optical signal and the third IM-DD component corresponding to an optical-intensity-modulated component included in the fourth optical signal are adjusted to have opposite phases and a same amplitude. Thus, the frequency modulation apparatus of the eighth aspect can more surely suppress the IM-DD components outputted from the optical receiver, generating high-frequency, wide-band FM signal of higher quality.

According to a ninth aspect, in the first aspect,
the frequency modulation apparatus further comprises an optical filter inserted between the first optical modulator and the beat signal generating part, the optical filter extracting an optical carrier component from the first optical signal,
the second light source emits unmodulated light as the second light, and
the beat signal generating part comprises a photo-detection device for receiving the optical carrier, component extracted by the optical filter and the second light, and generating the unmodulated beat signal through optical detection based on the square-law detection characteristic.

In the ninth aspect, the input electrical signal, is converted by the first optical modulator into a first optical signal, which is an optical-frequency-modulated signal. In the first optical heterodyne system as described in the first aspect, the optical carrier component is extracted from the first optical signal by the optical filter inserted between the first optical modulator and the beat signal generating part. The beat signal generating part generates an unmodulated beat signal from this optical carrier component and the second light without using a filter. This unmodulated beat signal, that is, the carrier component, is frequency-converted to be a frequency-converted signal. Then, in the second optical heterodyne system as described in the first aspect, the optical signal from the first optical modulator or the light from the second light source is amplitude-modulated or intensity-modulated with the above frequency-converted signal (frequency-converted carrier component). Thus, the frequency modulation apparatus of the ninth aspect can suppress the phase noise of the FM signal, which is a beat signal outputted from the optical receiver, realizing frequency modulation with low noise.

According to a tenth aspect, in the first aspect,
the frequency modulation apparatus further comprises
a branching circuit for branching the input electrical signal into first and second electrical signals having opposite phases to each other;
a fourth optical modulator for outputting the second light, which is a modulated light having a predetermined center frequency $f_2$, as a fourth optical signal;
a first optical filter inserted between the first optical modulator and the beat signal generating part; and
a second optical filter inserted between the fourth optical modulator and the beat signal generating part,
the first optical modulator generates the first optical signal having a predetermined center frequency $f_1$ by uniquely converting an amplitude variation of the first electrical signal into an optical frequency variation of the first light through direct modulation,
the fourth optical modulator generates the fourth optical signal having the predetermined center frequency $f_2$ by uniquely converting an amplitude variation of the second electrical signal into an optical frequency variation of the second light through direct modulation,
the first optical filter extracts an optical carrier component from the first optical signal,
the second optical filter extracts an optical carrier component from the fourth optical signal,
the beat signal generating part comprises a photo-detection device for receiving the optical carrier components extracted by the first and second optical filter, and generating the unmodulated beat signal at a frequency $f_s=|f_1-f_2|$ corresponding to a difference of optical frequencies between the optical carrier components through optical detection based on the square-law detection characteristic,
the frequency converter converts the unmodulated beat signal into a signal having a predetermined frequency $f_x$, and outputs the converted signal as the frequency-converted signal,
the second optical modulator generates the second optical signal by optical-amplitude-modulating or optical-intensity-modulating any one of the first and fourth optical signals with the frequency-converted signal having the frequency $f_x$, and
the optical receiver receives one of the first and fourth optical signals, which is not subjected to optical-amplitude-modulation or optical-intensity-modulation by the second optical modulator, and the second optical signal, generating the FM signal at a frequency $f_L=|f_s-f_x|$ through optical detection based on the square-law detection characteristic.

In the tenth aspect, the input electrical signal, which is an original signal for frequency modulation, is branched into first and second electrical signals with opposite phases to each other. The first electrical signal is converted by direct modulation of the first optical modulator into a first optical signal, which is an optical-frequency-modulated signal. The second electrical signal is converted by direct modulation of the fourth optical modulator into a fourth optical signal, which is an optical-frequency-modulated signal. The present frequency modulation apparatus constitutes two optical heterodyne systems. A first optical heterodyne system is constructed of the first optical modulator, the fourth optical modulator, and the beat signal generating part. A second optical heterodyne system is constructed of the first optical modulator, the fourth optical modulator, and the optical receiver. In the first optical heterodyne system, the optical carrier components are extracted from the first optical signal by the first optical filter and from the fourth optical signal by the second optical filter, respectively. The beat signal generating part generates an unmodulated beat signal from these optical carrier components without using a filter. This unmodulated beat signal, that is, the carrier component is frequency-converted to generate a frequency-converted signal. In the second optical heterodyne system, the optical signal from the first or fourth optical modulator is amplitude-modulated or intensity-modulated with the above frequency-converted signal (frequency-converted carrier component). Thus, the frequency modulation apparatus of the tenth aspect can suppress the phase noise of the FM signal, which is a beat signal outputted from the optical receiver, realizing frequency modulation of high quality with undesired components reduced.

According to an eleventh aspect, in the tenth aspect;, the frequency modulation apparatus further comprises a phase/amplitude adjusting part for adjusting a first IM-DD component and a third IM-DD component to have opposite phases and a same amplitude, the first IM-DD component corresponding to an optical-intensity-modulated component included in the first optical signal and the third IM-DD component corresponding to an optical-intensity-modulated component included in the fourth optical signal, the first and third IM-DD components being generated by the optical receiver through optical detection based on the square-law detection characteristic.

In the eleventh aspect, like the eighth aspect, the first IM-DD component corresponding to an optical-intensity-modulated component included in the first optical signal and the third IM-DD component included in the fourth optical signal are adjusted to have opposite phases and a same amplitude. Thus, the frequency modulation apparatus of the eighth aspect can more surely suppress the IM-DD components outputted from the optical receiver, generating high-frequency, wide-band FM signal of higher quality.

According to a twelfth aspect, in the first aspect, the frequency modulation apparatus further comprises:

a first propagation time adjusting part for equalizing an optical and electrical propagation time in a path from the first light source through the beat signal generating part to the optical receiver and an optical propagation time in a path from the first light source directly to the optical receiver; and a second propagation time adjusting part for equalizing an optical and electrical propagation time in a path from the second light source through the beat signal generating part to the optical receiver and an optical propagation time in a path from the second light source directly to the optical receiver.

In the twelfth aspect, the optical signal outputted from the first light source is branched into two optical signals. The frequency modulation apparatus equally sets the propagation time of these two optical signals passing through each component or being subjected to optical-electrical or electrical-optical conversion until they reach the optical receiver. Also, the optical signal outputted from the second light source is branched into two optical signals. The frequency modulation apparatus also equally sets the propagation time of these two optical signal passing through each component or being subjected to optical-electrical or electrical-optical conversion until they reach the optical receiver. Thus, the frequency modulation apparatus of the twelfth aspect can appropriately suppress the phase noise of the FM signal, which is a beat signal outputted from the optical receiver, realizing frequency modulation with lower noise.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the configuration of a frequency modulation apparatus according to a first embodiment of the present invention;

FIG. 9 is a block diagram showing the configuration of a frequency modulation apparatus according to a first modified embodiment, which is a modification of the first embodiment;

DESCRIPTION OF THE PREFERRED EMBODIMENTS

First Embodiment

Figure 2A:
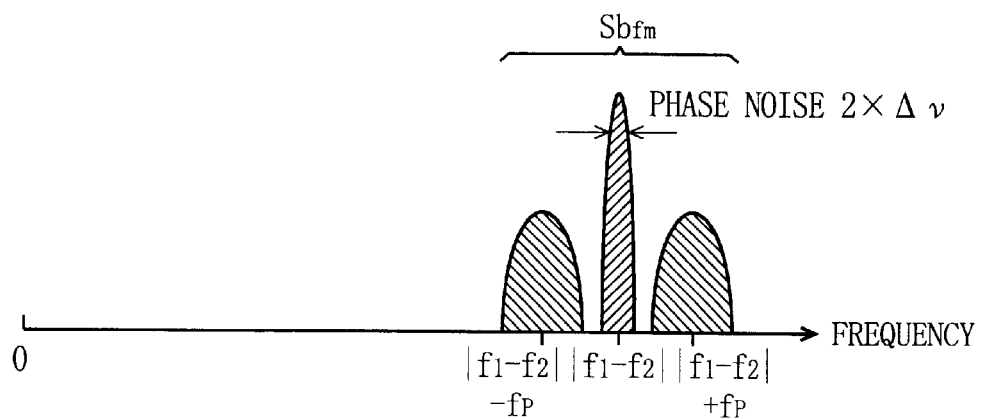
FIG. 2A is a schematic diagram showing a frequency spectrum of an output signal from a first optical receiver in the frequency modulation apparatus according to the first embodiment.

Described below is a frequency modulation apparatus according to a first embodiment of the present invention with reference to FIGS. 1 and 2A to 2C.

FIG. 1 is a block diagram showing the configuration of the frequency modulation apparatus according to the first embodiment. This frequency modulation apparatus includes a signal source 100, a first optical modulator 102, a local light source 103, a first optical branching circuit 104, a second optical branching circuit 105, a first optical waveguide 106, a second optical waveguide 107, a third optical waveguide 108, a fourth optical waveguide 109, a beat signal generating part 200 including a first optical receiver 110 and a filter 111, a frequency converter 112, a second optical modulator 113, and a second optical receiver 114. With optical frequency modulation and optical heterodyne detection using two light sources (first and second light sources) each emitting light (a first light L1 and a second light L2, respectively) with different optical frequencies, the present frequency modulation apparatus converts an electrical signal Si supplied from the signal source 100 into a frequency modulated signal, and outputs the frequency modulated signal as an FM signal Sfm.

Described next is the operation of the frequency modulation apparatus shown in FIG. 1 in detail. The first optical modulator 102 is an optical modulator employing the direct modulation scheme, generally constructed of a semiconductor laser, which is a first light source having optical frequency modulation effects. By amplitude-modulating an injection current to the semiconductor laser with the electrical signal Si supplied from the signal source 100, the first optical modulator 102 outputs an optical-frequency-modulated signal having a center frequency $f_1$ as the first light L1. The optical-frequency-modulated signal L1 supplied from the first optical modulator 102 is branched into two optical signals in the first optical branching circuit 104. One of the two optical signals is supplied through the second optical waveguide 107 to the first optical receiver 110 in the beat signal generating part 200, while the other is supplied through the first optical waveguide 106 to the second optical receiver 114. The local light source 103, which is a second light source, emits unmodulated light having an optical frequency $f_2$ as the second light L2. The light L2 emitted from the local light source 103 is branched into two in the second optical branching circuit 105, one being supplied through the fourth optical waveguide 109 to the first optical receiver 110 in the beat signal generating part 200, and the other being supplied through the third optical waveguide 108 to the second optical modulator 113.

The beat signal generating part 200 receives the optical signal L1, which is the first light from the first optical branching circuit 104, and the second light L2 from the second optical branching circuit 105. The beat signal generating part 200 then generates an unmodulated electrical signal (hereinafter referred to as unmodulated beat signal) Sb having a frequency $f_s=|f_1-f_2|$ equal to the difference of optical frequencies between the first and second lights L1 and L2. The generating operation of the beat signal generating part 200 is now described. The first optical receiver 110 of the beat signal generating part 200 is constructed of a photo-detection device such as a photodiode having square-law detection characteristics. The first optical receiver 110 receives the optical signal L1 from the first optical modulator 102 and the light L2 from the local light source 103, generating a beat signal (hereinafter referred to as modulated beat signal) Sbfm having a center frequency $f_s$ $(=|f_1-f_2|)$ equal to the difference of optical frequencies between the lights L1 and L2 through optical heterodyne detection based on the square-law detection characteristics. The modulated beat signal Sbfm is an FM signal obtained by down-converting the optical-frequency-modulated signal L1 from the first optical modulator 102. FIG. 2A shows the frequency spectrum of the modulated beat signal Sbfm assuming that the electrical signal Si supplied from the signal source 100 is a signal having a center frequency fp. The modulated beat signal Sbfm is supplied to the filter 111. The filter 111 is a band pass filter, extracting only the carrier component (the component having the frequency $f_s$) of the modulated beat signal Sbfm, which is the FM signal, and outputting the carrier component as the unmodulated beat signal Sb to the frequency converter 112.

Figure 2B:
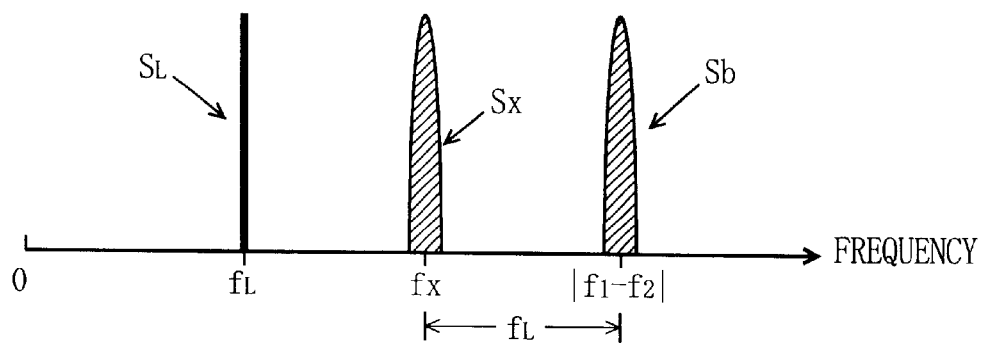
FIG. 2B is a schematic diagram showing frequency spectrums of an input signal and an output signal of a frequency converter in the frequency modulation apparatus according to the first embodiment.

The frequency converter 112 converts (down-converts, for example) the frequency of the unmodulated beat signal Sb, which is the carrier component supplied from the filter 111, with a local signal SL having a frequency $f_L$, for example, outputting the signal having a frequency $f_x$ $(=|f_s-f_L|)$ as a frequency-converted signal Sx. FIG. 2B shows the frequency spectrums of the unmodulated beat signal Sb, which is an input signal of the frequency converter 112, and the frequency-converted signal Sx, which is an output signal therefrom, together with a frequency spectrum of the local signal SL.

The second optical modulator 113 is placed on the second optical waveguide 108, optically modulating the unmodulated light L2 emitted from the local light source 103 with the frequency-converted signal Sx from the frequency converter 112. More specifically, the second optical modulator 113 converts, the unmodulated light L2 into an optical modulated signal L2x through optical amplitude modulation or optical intensity modulation and supplies the optical modulated signal L2x to the second optical receiver 114.

Figure 2C:
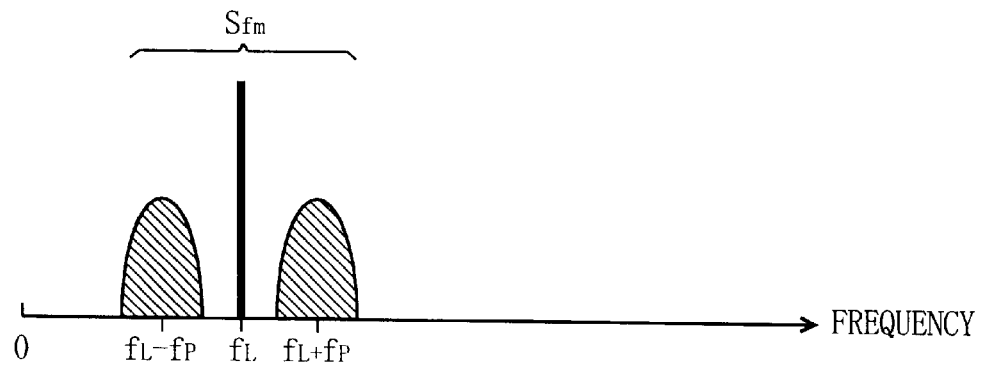
FIG. 2C is a schematic diagram showing a frequency spectrum of an output signal from a second optical receiver in the frequency modulation apparatus according to the first embodiment.

The second optical receiver 114 is constructed of a photo-detection device such as a photodiode having square-law detection characteristics. The second optical receiver 114 receives the optical signal L1 from the first optical modulator 102 and the optical signal L2x from the second optical modulator 113, generating an FM signal Sfm as a beat signal having a center frequency $f_L$ $(=|f_s-f_x|)$ through optical heterodyne detection based on the square-law detection characteristics. The FM signal Sfm generated as in the above described manner is a signal obtained by down-converting the optical-frequency-modulated signal. L1 from the first optical modulator 102, with the phase noise suppressed as shown in FIG. 2C.

The phase noise suppressing effects of the FM signal in the present embodiment is now described using equations.

The electric field component of the optical-frequency-modulated signal L1 from the first optical modulator 102 is given by $$E_1(t) = A_1\{1+m_1\cos(2\pi f_p t)\}^{1/2} \cos\{2\pi f_1 t + \Delta F \sin(2\pi f_p t) + \phi_1\} \quad (1),$$

while the electric field component of the unmodulated light L2 from the local light source 103 is given by $$E_2(t) = A_2 \cos\{2\pi f_2 t + \phi_2\} \quad (2),$$

where $m_1$ is the optical (intensity) modulation factor in the first optical modulator 102, $f_p$ is the frequency of the electrical signal Si (a sine wave is assumed) from the signal source 100, $f_1$ and $f_2$ are the optical frequencies of the lights from the first optical modulator 102 and the local light source 103, respectively, $\phi_1$ and $\phi_2$ are the phase noise of the lights from the first optical modulator 102 and the local light source 103, and $\Delta F$ is frequency deviation given by the first optical modulator 102 in response to the electrical signal Si from the signal source 100.

When the first optical receiver 110 receives combined light of these two lights L1 and L2, the photocurrent given by the following equation (3) passes through the photo-detection device used in the first optical receiver 110 with the square-law detection characteristics.

$$\begin{aligned}I_1(t) &= R_1|E_1(t)+E_2(t)|^2 \quad (3)\\ &= R_1 A_1^2\{1+m_1\cos(2\pi f_p t)\}\cos^2\{2\pi f_1 t + \Delta F\sin(2\pi f_p t)+\phi_1\} + \\ &\quad R_1 A_2^2 \cos^2(2\pi f_2 t + \phi_2) + \\ &\quad 2R_1 A_1 A_2 \{1+m_1\cos(2\pi f_p t)\}^{1/2}\cos\{2\pi f_1 t + \Delta F\sin(2\pi f_p t)+\phi_1\}\times\\ &\quad \cos(2\pi f_2 + \phi_2)\end{aligned}$$

Here, $R_1$ is conversion efficiency of the photo-detection device used in the first optical receiver 110. The signal components of the first and second terms in the above equation (3) are not detected due to frequency response limit of the photo-detection device used in the first optical receiver 110. The signal components of the first term includes an IM-DD (Intensity Modulation-Direct Detection) component generated by direct detection of the optical intensity modulation component in the optical signal L1 from the first optical modulator 102. Such IM-DD component, however, can be ignored because this IM-DD component is suppressed by the filter 111, which will be described later.

If the third term in the equation (3) is further developed, $$I_{cf}(t) = R_2 A_1 A_2 \{1+m_1\cos(2\pi f_p t)\}^{1/2}\times[\cos\{2\pi(f_1+f_2)t+\Delta F\sin(2\pi f_p t)+\phi_1+\phi_2\}+\cos\{2\pi(f_1-f_2)t+\Delta F\sin(2\pi f_p t)+\phi_1-\phi_2\}] \quad (4)$$

is obtained. The signal component of the first term in brackets [ ] in the equation (4) is not detected due to the frequency response limit of the photo-detection device used in the first optical receiver 110, but only the signal component of the second term in brackets [ ] is detected. The second term represents the FM signal whose carrier frequency is $f_s = |f_1-f_2|$ and frequency deviation is $\Delta F$, generated from the electrical signal Si from the signal source 100. The FM signal of the second term has the phase noise determined by the phase noise $\phi_1$ of the optical signal L2 from the first optical modulator 102 and the phase noise 2 of the light L2 from the local light source 103.

The filter 111 passes only the unmodulated beat signal Sb represented by $$I_s(t) = \cos\{2\pi(f_1-f_2)t+\phi_1-\phi_2\} \quad (5)$$

as the carrier component (the component of the center frequency $f_s$) in the FM signal represented by the equation (4).

The frequency converter 112 converts the frequency of the unmodulated beat signal Sb represented by the equation (5) with the local signal SL having the frequency $f_L$. For example, the unmodulated beat signal Sb is down-converted into a signal (frequency-converted signal Sx) of a frequency $f_x = |f_1-f_2-f_L|$ represented by $$\begin{aligned}I_x(t) &= \cos\{2\pi(f_1-f_2-f_L)t+\phi_1-\phi_2\} \quad (6)\\ &= \cos\{2\pi f_x t + \phi_1 - \phi_2\}.\end{aligned}$$

With the frequency-converted signal Sx represented by the equation (6), the second optical modulator 113 optically modulates, for example, the amplitude of the unmodulated light L2 (refer to the equation (2)) emitted from the local light source 103, outputting an optical modulated signal L2x whose electric field component is represented by $$E_{2x}(t) = A_2\cos(2\pi f_x t+\phi_1-\phi_2)\cos(2\pi f_2 t+\phi_2) \quad (7).$$

The second optical receiver 114 combines the optical modulated signal L1 (refer to the equation (1)) from the first optical modulator 102 and the optical modulated signal L2x (refer to the equation (7)) from the second optical modulator 113, producing, with its square-law detection characteristics, a photocurrent represented by $$\begin{aligned}I_2(t) &= R_2|E_1(t)+E_{2x}(t)|^2 \quad (8)\\ &= R_2 A_1^2\{1+m_1\cos(2\pi f_p t)\}\cos^2\{2\pi f_1 t+\Delta F\sin(2\pi f_p t)+\phi_1\}+\\ &\quad R_2 A_2^2\cos^2(2\pi f_x t+\phi_1-\phi_2)\cos^2(2\pi f_2 t+\phi_2)+\\ &\quad 2R_2 A_1 A_2\{1+m_1\cos(2\pi f_p t)\}^{1/2}\cos\{2\pi f_1 t+\Delta F\sin(2\pi f_p t)+\phi_1\}\times\\ &\quad \cos(2\pi f_x t+\phi_1-\phi_2)\cos(2\pi f_2+\phi_2),\end{aligned}$$

where $R_2$ is conversion efficiency of the photo-detection device used in the second optical receiver 114. The signal components of the first and second terms in the equation (8) are not detected due to the frequency response limit of the photo-detection device used in the second optical receiver 114. The signal components of the first term includes an IM-DD (Intensity Modulation-Direct Detection) component generated by direct detection of the optical intensity modulation component in the optical signal L1 from the first optical modulator 102. Such IM-DD component, however, may be ignored if the frequency band thereof is away from that of the FM signal Sfm. If the frequency band of the IM-DD component overlaps that of the FM signal Sfm, the IM-DD component can be suppressed with another embodiment of the present invention, which will be described later.

If the third term of the equation (8) is further developed, $$I_{C2} = R_2 A_1 A_2 \{1 + m_1 \cos(2\pi f_p t)\}^{1/2} \times \qquad (9)$$

$$[\cos(2\pi f_x t + \phi_1 - \phi_2)\cos\{2\pi(f_1 + f_2)t + \Delta F \sin(2\pi f_p t) +$$

$$\phi_1 + \phi_2\} + \cos(2\pi f_x t + \phi_1 - \phi_2)\cos\{2\pi(f_1 - f_2)t +$$

$$\Delta F \sin(2\pi f_p t) + \phi_1 - \phi_2\}]$$

$$= (R_2 A_1 A_2 / 2)\{1 + m_1 \cos(2\pi f_p t)\}^{1/2} \times$$

$$[\cos\{2\pi(f_1 + f_2 + f_x)t + \Delta F \sin(2\pi f_p t) + 2\phi_1\} +$$

$$\cos\{2\pi(f_1 + f_2 - f_x)t + \Delta F \sin(2\pi f_p t) + 2\phi_2\} +$$

$$\cos\{2\pi(f_1 - f_2 + f_x)t + \Delta F \sin(2\pi f_p t) + 2(\phi_1 - \phi_2)\} +$$

$$\cos\{2\pi(f_1 - f_2 - f_x)t + \Delta F \sin(2\pi f_p t)\}]$$

is obtained. The signal components of the first and second terms in brackets [ ] in the equation (9) are not detected due to the frequency response limit of the photo-detection device used in the second optical receiver 114, but only those of the third and fourth terms in the brackets [ ] are outputted as the FM signal Sfm. The fourth term represents the FM signal whose carrier frequency is $f_L = |f_1 - f_2 - f_x|$ and frequency deviation is $\Delta F$, generated from the electrical signal Si from the signal source 100. The FM signal of the fourth term is without any phase noise, not being affected by the phase noise $\phi_1$ of the optical signal L1 from the first optical modulator 102 or the phase noise $\phi_2$ of the light L2 from the local light source 103.

When the second optical modulator 113 modulates the optical intensity of the unmodulated light L2 (refer to the equation (2)) from the local light source 103 with the frequency-converted signal Sx represented by the equation (6), the electric field component of the optical modulated signal outputted from the second optical modulator 113 is represented by $$E_{2y}(t) = A_2 \{1 + m_2 \cos(2\pi f_x t + \phi_1 - \phi_2)\}^{1/2} \cos(2\pi f_2 t + \phi_2).$$

From this equation, an approximate equation can be derived as $$E_{2y}(t) = A_2 \{1 + (m_2/2)\cos(2\pi f_x t + \phi_1 - \phi_2)\}\cos(2\pi f_2 t + \phi_2) \qquad (10),$$

where $m_2$ is an optical (intensity) modulation index on the second optical modulator 113. Since the first term in braces { } in the equation (10) represents the unmodulated light component, only the second term therein will be considered below.

The second optical receiver 114 combines the optical modulated signal L1 (refer to the equation (1)) from the first optical modulator 102 and the optical modulated signal L2x (refer to the second term in the braces { } in the equation (10)) from the second optical modulator 113, producing, with its square-law detection characteristics, a photocurrent represented by law detection characteristic, a photocurrent represented by $$I_2(t) = R_2 |E_1(t) + E_{2y}(t)|^2 \qquad (11)$$

$$= R_2 A_1^2 \{1 + m_1 \cos(2\pi f_p t)\}\cos^2\{2\pi f_1 t + \Delta F \sin(2\pi f_p t) + \phi_1\} +$$

$$R_2 A_2^2 (m_2^2/4)\cos^2(2\pi f_x t + \phi_1 - \phi_2)\cos^2(2\pi f_2 t + \phi_2) +$$

-continued $$2R_2 A_1 A_2 \{1 + m_1 \cos(2\pi f_p t)\}^{1/2} \cos\{2\pi f_1 t +$$

$$\Delta F \sin(2\pi f_p t) + \phi_1\} \times$$

$$(m_2/2)\cos(2\pi f_x t + \phi_1 - \phi_2)\cos(2\pi f_2 + \phi_2).$$

The signal components of the first and second terms in the equation (11) are not detected due to the frequency response limit of the photo-detection device used in the second optical receiver 114. The signal components of the first term includes an IM-DD component generated by direct detection of the optical intensity modulation component in the optical signal L1 from the first optical modulator 102. Such IM-DD component, however, may be ignored if the frequency band thereof is away from the that of the FM signal Sfm. If the frequency band of the IM-DD component overlaps that of the FM signal Sfm, the IM-DD component can be suppressed with another embodiment of the present invention, which will be described later.

If the third term of the equation (11) is further developed, $$I_{C2}(t) = (R_2 A_1 A_2 m_2 / 2)\{1 + m_1 \cos(2\pi f_p t)\}^{1/2} \times \qquad (12)$$

$$[\cos(2\pi f_x t + \phi_1 - \phi_2)\cos\{2\pi(f_1 + f_2)t + \Delta F \sin(2\pi f_p t) +$$

$$\phi_1 + \phi_2\} + \cos(2\pi f_x t + \phi_1 - \phi_2)\cos\{2\pi(f_1 - f_2)t +$$

$$\Delta F \sin(2\pi f_p t) + \phi_1 - \phi_2\}]$$

$$= (R_2 A_1 A_2 m_2 / 4)\{1 + m_1 \cos(2\pi f_p t)\}^{1/2} \times$$

$$[\cos\{2\pi(f_1 + f_2 + f_x)t + \Delta F \sin(2\pi f_p t) + 2\phi_1\} +$$

$$\cos\{2\pi(f_1 + f_2 - f_x)t + \Delta F \sin(2\pi f_p t) + 2\phi_2\} +$$

$$\cos\{2\pi(f_1 - f_2 + f_x)t + \Delta F \sin(2\pi f_p t) + 2(\phi_1 - \phi_2)\} +$$

$$\cos\{2\pi(f_1 - f_2 - f_x)t + \Delta F \sin(2\pi f_p t)\}] \dots$$

is be obtained. Similarly to the equation (9), the fourth term in the brackets [ ] in the equation (12) represents the FM signal whose carrier frequency is $f_L = |f_2 - f_x|$ and frequency deviation is $\Delta F$, generated from the electrical signal Si from the signal source 100. The FM signal of the fourth term is without any phase noise, not being affected by the phase noise $\phi_1$ of the optical signal L1 from the first optical modulator 102 and the phase noise $\phi_2$ of the light L2 from the local light source 103.

As evident from the comparison between the equations (9) and (12), the magnitude (amplitude) of the FM signal L2x from the second optical receiver 114 is doubled when optical amplitude modulation is applied thereto in the second optical modulator 113, which is advantageous in CNR (carrier-to-noise ratio) for transmission of the FM signal. Therefore, in the following description, assume that optical amplitude modulation is employed in the second optical modulator 113.

As described above, according to the first embodiment, the optical heterodyne configuration using two light sources allows generation of a high-frequency, wide-band FM signal with any phase noise suppressed, not being affected by the phase noise of the light sources.

Second Embodiment

Described below is a frequency modulation apparatus according to a second embodiment of the present invention with reference to FIGS. 3, and 4A to 4C.

Figure 3:
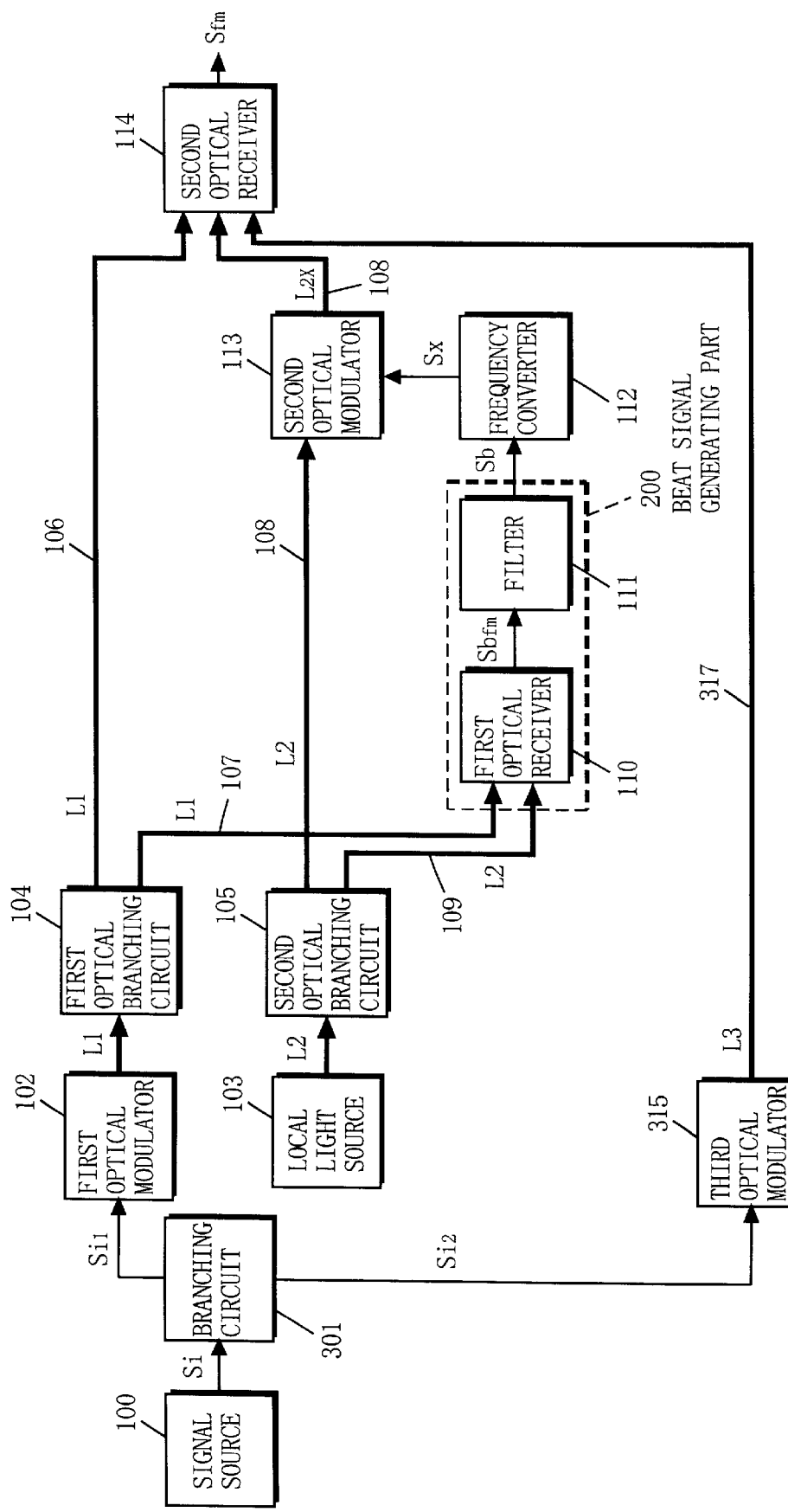
FIG. 3 is a block diagram showing the configuration of a frequency modulation apparatus according to a second embodiment of the present invention.

FIG. 3 is a block diagram showing the configuration of the frequency modulation apparatus according to the second embodiment. In addition to the components of the first embodiment shown in FIG. 1, the present frequency modulation apparatus further includes a branching circuit 301, a third optical modulator 315, and a fifth optical waveguide 317. Note that, in FIG. 3, the same components as those in the first embodiment are provided with the same reference numerals.

Described next is the operation of the present embodiment shown in FIG. 3, but only the differences from the first embodiment.

In the frequency modulation apparatus of the present embodiment, the branching circuit 301 branches an electrical signal Si outputted from the signal source 100 into a first electrical signal Si1 and a second electrical signal Si2 having opposite phases to each other, and supplies these two signals Si1 and Si2 to the first optical modulator 102 and the third optical modulator 315, respectively. The first optical modulator 102 converts the first electrical signal Si1 from the branching circuit 301 into an optical-frequency-modulated signal L1, and supplies the same to the first optical branching circuit 104, as in the first embodiment. The third optical modulator 315 is generally constructed of a semiconductor laser or the like, converting the second electrical signal Si2 from the branching circuit 301 into an optical-intensity-modulated signal L3, and supplying the same to the second optical receiver 114 through the fifth optical waveguide 317.

Figure 4A:
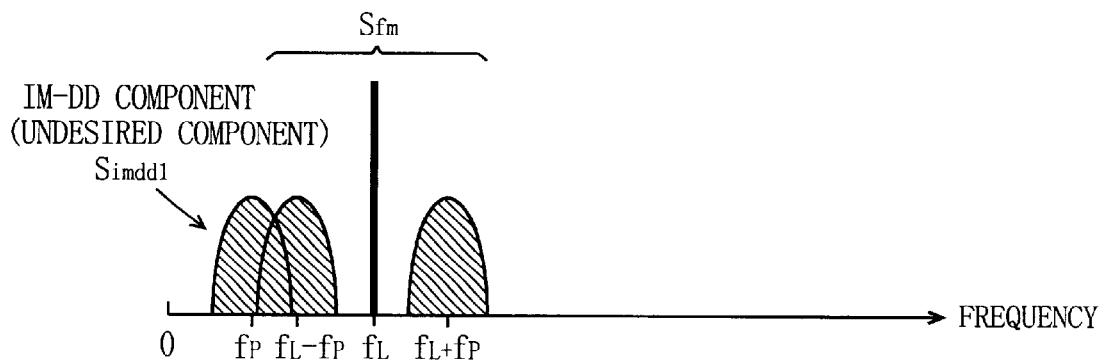
FIG. 4A is a schematic diagram showing frequency spectrums of optical-electrical converted signals corresponding to optical signals outputted from the first and second optical modulators and inputted to the second optical modulator in the frequency modulation apparatus according to the second embodiment.
Figure 4B:
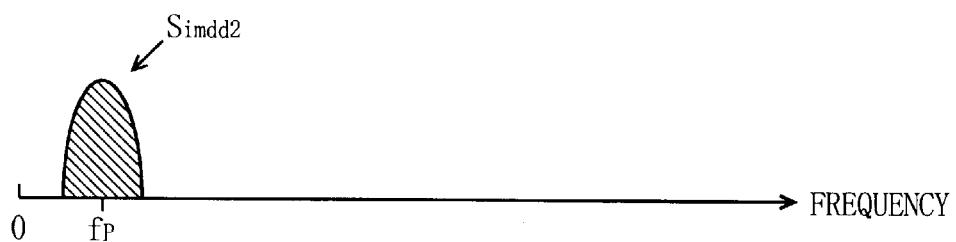
FIG. 4B is a schematic diagram showing a frequency spectrum of an optical-electrical converted signal corresponding to an optical signal outputted from a third optical modulator and inputted to the second optical modulator in the frequency modulation.apparatus according to the second embodiment.
Figure 4C:
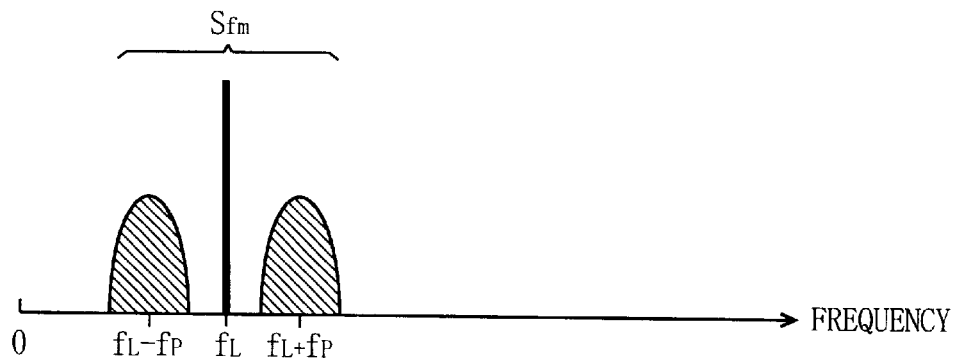
FIG. 4C is a schematic diagram showing a frequency spectrum of an output signal from the second optical receiver in the frequency modulation apparatus according to the second embodiment.

The second optical receiver 114 receives the optical signal L1 from the first optical modulator 102 and the optical signal L2x from the second optical modulator 113, generating an FM signal Sfrm of a beat signal having a center frequency equal to the difference of optical frequencies between these optical signals L1 and L2x through optical heterodyne detection based on its square-law detection characteristics. The second optical receiver 114 also receives the optical-intensity-modulated signal L3 from the third optical modulator 315, generating an IM-DD component from the optical-intensity-modulated signal L3 with direct detection based on its square-law detection characteristics. If the direct modulation scheme using a semiconductor laser is employed in the first optical modulator 102 as described in the first embodiment, the optical signal L1 from the first optical modulator 102 includes an optical intensity modulation component as well as an optical frequency modulation component. Therefore, as shown in FIG. 4A, the second optical receiver 114 receives the optical signal L1 from the first optical modulator 102 and the optical signal L2x from the second optical modulator 113, generating an FM signal, which is a beat signal of these two optical signals through optical heterodyne detection, and also generating a first IM-DD component Simdd1 corresponding to the optical intensity-modulation component included in the optical signal from the first optical modulator 102 through direct detection. The first IM-DD component Simdd1 is an undesired component for the desired FM signal Sfm. Specifically, as shown in FIG. 4A, when the occupied frequency band of the first IM-DD component Simdd1 overlaps that of the FM signal Sfm, the quality of the FM signal is extremely degraded. By also receiving the optical-intensity-modulated signal L3 from the third optical modulator 315, the second optical receiver 114 generates the IM-DD component of the optical-intensity-modulated signal L3, that is, a second IM-DD component Simdd2 having an opposite phase to the first IM-DD component Simdd1 through direct detection, as shown in FIG. 4B. The first IM-DD component Simdd1 is cancelled by the second IM-DD component Simdd2, thereby being suppressed, as shown in FIG. 4C.

As described above, according to the second embodiment, the frequency modulation apparatus can prevent occurrence of an undesired IM-DD component caused due to the optical-intensity-modulated component included in the optical signal L1, and generate a high-frequency, wide-band FM signal of high quality with phase noise suppressed.

Third Embodiment

Described below is a frequency modulation apparatus according to a third embodiment of the present invention, with reference to FIG. 5.

Figure 5:
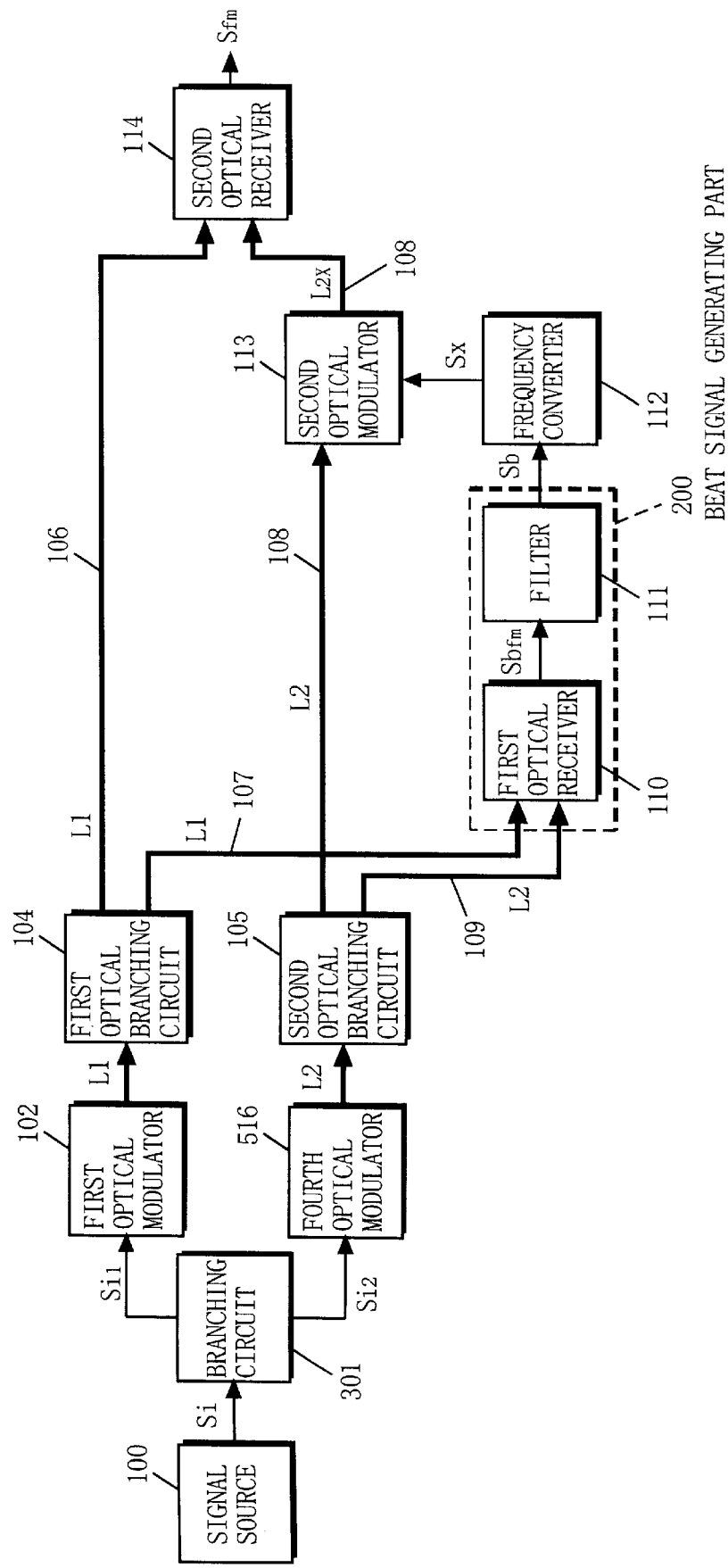
FIG. 5 is a block diagram showing the configuration of a frequency modulation apparatus according to a third embodiment.

FIG. 5 is a block diagram showing the configuration of the frequency modulation apparatus according to the third embodiment. The present frequency modulation apparatus includes a branching circuit 301 and a fourth optical modulator 516 instead of the local light source 103 in the configuration of the first embodiment shown in FIG. 1. Note that, in FIG. 5, the same components as those in the first embodiment are provided with the same reference numerals.

As 10 Described next is the operation of the present embodiment shown in FIG. 5.

In the frequency modulation apparatus of the present invention, the branching circuit 301 branches the electrical signal Si outputted from the signal source 100 into the first and second electrical signals Si1 and Si2 having opposite phases to each other. Similarly to the first embodiment, the first optical modulator 102 converts the first electrical signal Si1 from the branching circuit 301 into the optical-frequency-modulated signal L1, and supplies the same to the first optical branching circuit 104. The optical signal L1 is branched into two optical signals in the first optical branching circuit 104, one being supplied through the second optical waveguide 107 to the first optical receiver 110 in the beat signal generating part 200 and the other being supplied through the first optical waveguide 106 to the second optical receiver 114.

The fourth optical modulator 516 of the direct modulation scheme is generally constructed of a semiconductor laser or the like, converting the second electrical signal Si2 from the branching circuit 301 into the optical-frequency-modulated signal L2, and supplies the same to the second optical branching circuit 105. Since the direct modulation scheme is employed in the fourth optical modulator 516, like the first optical modulator 102, the optical signal L2 to be outputted includes the optical intensity modulation component as well as the optical frequency modulation component. The optical signal L2 from the fourth optical modulator 516 is branched into two optical signals in the second optical branching circuit 105, one being supplied through the fourth optical waveguide 109 to the first optical receiver 110 in the beat signal generating part 200, the other being supplied through the third optical waveguide 108 to the second optical modulator 113.

The beat signal generating part 200 receives the optical signal L1 from the first optical branching circuit 104 and the optical signal L2 from the second optical branching circuit 105, generating an unmodulated electrical signal Sb having a frequency $f_s=|f_1-f_2|$ equal to the difference of optical frequencies between the first and second optical signals L1 and L2. The operation of the beat signal generating part 200 is now described. The first optical receiver 110 of the beat signal generating part 200 is constructed of a photo-detection device having square-law detection characteristics such as a photo diode, receiving the optical signal L1 from the first optical modulator 102 and the optical signal L2 from the fourth optical modulator 516, generating a modulated beat signal Sbfm having a center frequency $f_s$ ($=|f_1-f_2|$) equal to the difference of optical frequencies between these two optical signals through optical heterodyne detection based on its square-law detection characteristics. The modulated beat signal Sbfm is an FM signal obtained by down-converting the optical-frequency-modulated signal L1 outputted from the first optical modulator 102. The filter 111 extracts only the carrier component (the component having the frequency $f_x$) of the modulated beat signal Sbfm, outputting the carrier as the unmodulated beat signal Sb to the frequency converter 112.

The frequency converter 112 coverts (down-converts, for example) the frequency of the unmodulated beat signal Sb, outputting a frequency-converted signal Sx having a frequency $f_x$ (=$|f_s-f_L|$) to the second optical modulator 113.

The second optical modulator 113 is placed on the second optical waveguide 108, optically modulating the optical signal L2 from the fourth optical modulator 516 with the frequency-converted signal Sx from the frequency converter 112 More specifically, the second optical modulator 113 converts the optical signal L2 into an optical modulated signal L2x through optical amplitude modulation or optical intensity modulation, and supplies the same to the second optical receiver 114.

The second optical receiver 114 receives the optical signal L1 from the first optical modulator 102 and the optical signal L2x from the second optical modulator 113, generating an FM signal Sfm with its phase noise suppressed as a beat signal having a center frequency $f_L$ (=$|f_s-f_x|$) through optical heterodyne detection based on its square-law detection characteristics (refer to FIG. 2C). Furthermore, the second optical receiver 114 generates a first IM-DD component corresponding to the optical intensity modulation component included in the optical signal L1 from the first optical modulator 102 through direct detection based on its square-law detection characteristics. The second optical receiver 114 also receives the optical intensity modulation component included in the optical signal L2 from the fourth optical modulator 516, generating a third IM-DD component of an opposite phase to the first IM-DD component through direct detection based on its square-law detection characteristics. This third IM-DD component cancels out the first IM-DD component, and thus the FM signal Sfm with the IM-DD component suppressed can be obtained.

As described above, the third embodiment can prevent occurrence of an undesired IM-DD component caused due to the optical intensity modulation component included in the optical signal L1, and generate a high-frequency, wide-band FM signal Sfm of high quality with phase noise suppressed.

Fourth Embodiment

Described next is a frequency modulation apparatus according to a fourth embodiment of the present invention with reference to FIG. 6.

Figure 6:
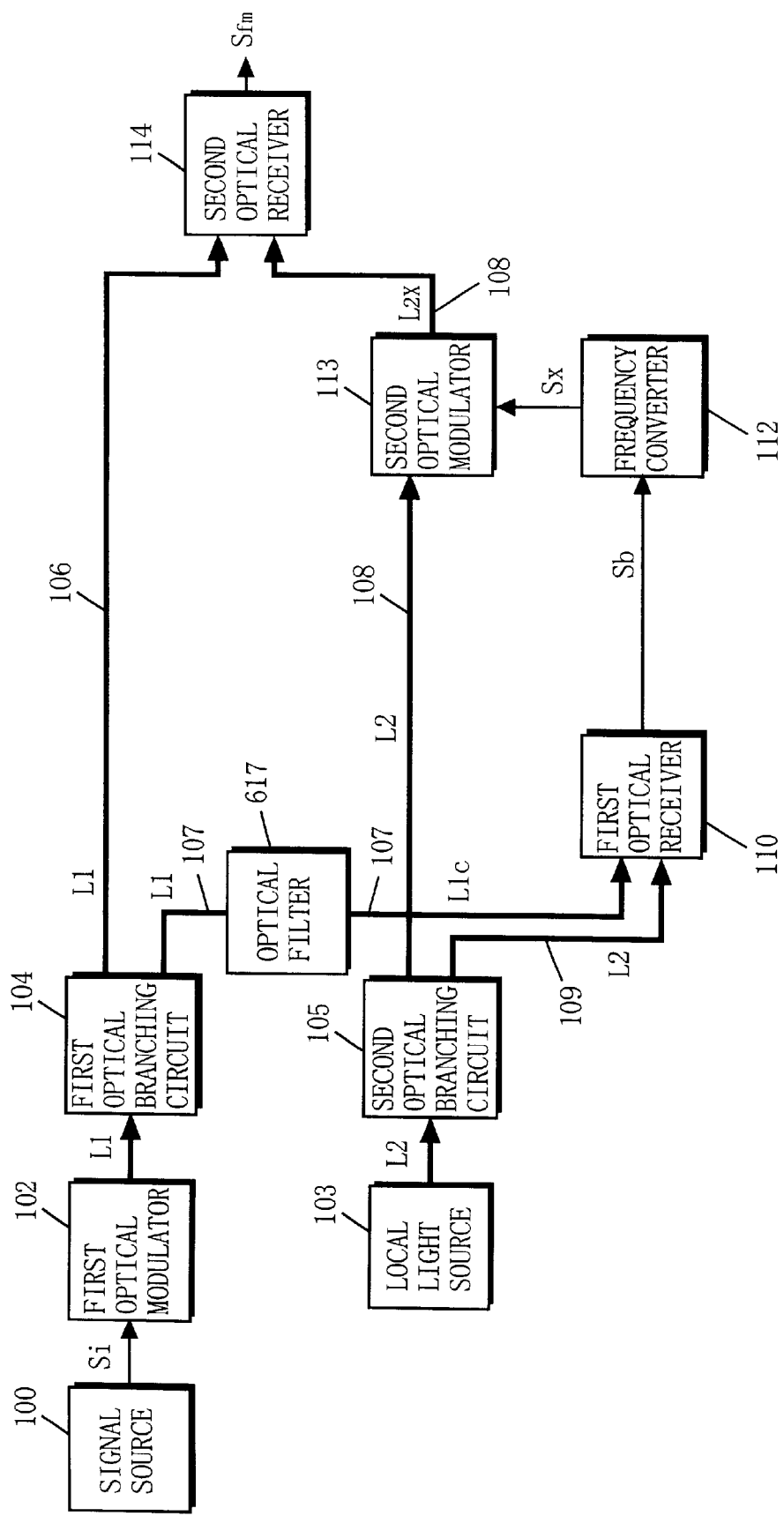
FIG. 6 is a block diagram showing one configuration of a frequency modulation apparatus according to a fourth embodiment.

FIG. 6 is a block diagram showing the configuration of the frequency modulation apparatus according to the fourth embodiment. The present frequency modulation apparatus has the same configuration as that in the first embodiment shown in FIG. 1 except that the electrical filter 111 is replaced with an optical filter 617. Note that, in FIG. 6, the same components as those in the first embodiment are provided with the same reference numerals.

Described next is the operation of the present embodiment shown in FIG. 6, only the differences from the first embodiment.

In the frequency modulation apparatus of the present embodiment, the optical filter 617 passes only an optical carrier component L1c of the optical signal L1 from the first optical branching circuit 104 to the first optical receiver 108

The first optical receiver 110 receives the optical carrier L1c passing through the optical filter 617 and the light L2 from the local light source 103, generating an unmodulated beat signal Sb having a frequency equal to the difference $f_s$ of optical frequencies between these two lights through optical heterodyne detection based on its square-law detection characteristics. The frequency converter 112 converts the frequency of the unmodulated beat signal Sb, generating a frequency-converted signal Sx having a frequency $f_x$. The second optical modulator 113 subjects the light L2 from the local light source 103 to optical modulation (amplitude or intensity modulation) with the frequency-converted signal Sx from the frequency converter. 112, supplying an optical modulated signal L2x to the second optical receiver 114. Receiving the optical signal L1 from the first optical modulator 102 and the optical signal L2x from the second optical modulator 113, the second optical receiver 114 generates an FM signal Sfm with phase noise suppressed as a beat signal having a center frequency $f_L$ (=$|f_s-f_x|$) through optical heterodyne detection based on the its square-law detection characteristics.

As described above, according to the fourth embodiment, the optical heterodyne configuration of the frequency modulation apparatus using two light sources allows generation of a high-frequency, wide-band FM signal with any phase noise suppressed, not being affected by the phase noise from the two light sources.

Figure 7:
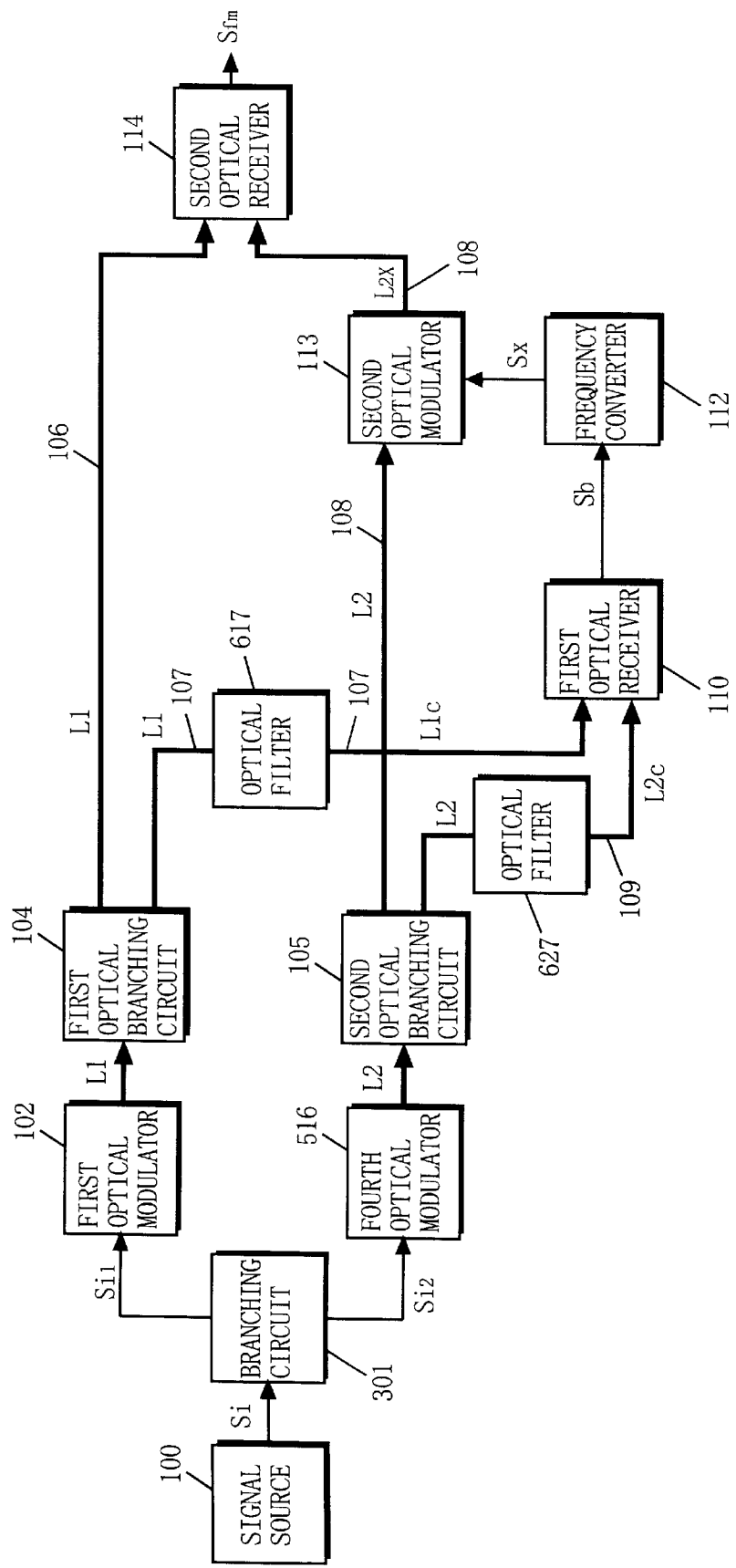
FIG. 7 is a block diagram showing another configuration of the frequency modulation apparatus according to the fourth embodiment.

The configuration including the fourth optical modulator 516 instead of the local light source 103 as in the third embodiment (refer to FIG. 5) may include, as shown in FIG. 7, the first optical filter 617 on the second optical waveguide 107 as in the fourth embodiment, and further a second optical filter 627 on the fourth optical waveguide 109. In this configuration, the second optical filter 627 passes only the optical carrier component of the optical signal L2 from the fourth optical modulator 516 through the second optical branching circuit 105 to the first optical receiver 110. In such configuration, the unmodulated beat signal Sb is outputted from the first optical receiver 110 as in the third embodiment, thereby allowing generation of a high-frequency, wide-band FM signal with phase noise suppressed without the: use of the electrical filter 111.

Fifth Embodiment

Described below is a frequency modulation apparatus according to a fifth embodiment of the present invention with reference to FIG. 8.

Figure 8:
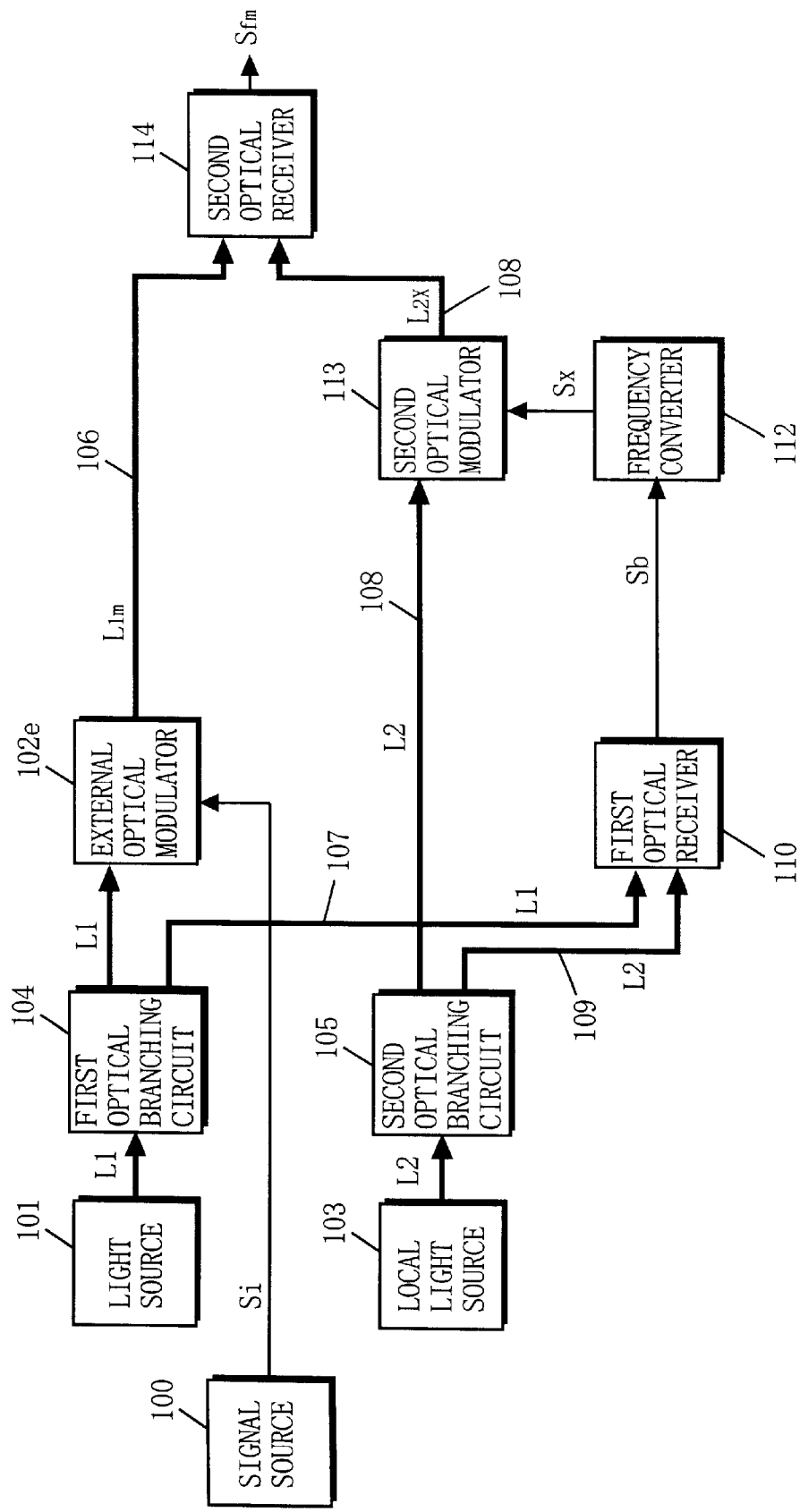
FIG. 8 is a block diagram showing the configuration of a frequency modulation apparatus according to a fifth embodiment.

FIG. 8 is a block diagram showing the configuration of the frequency modulation apparatus according to the fifth embodiment. The present frequency modulation apparatus has the same configuration as that in the first embodiment shown in FIG. 1 except that the first optical modulator 102 of the direct modulation scheme is replaced with a light source 101 emitting unmodulated light having an optical frequency $f_1$ as first light L1, and an external optical modulator 102e for frequency modulation according to an external modulation scheme, and also except that the filter 111 is omitted herein. As shown in FIG. 8, the unmodulated light L1 emitted from the light source 101 is supplied to the first optical branching circuit 104. The external optical modulator 102e is placed on the first optical waveguide 106, receiving an electrical signal Si from the signal source 100. Note that, in FIG. 8, the same components as those in the first embodiment are provided with the same reference numerals.

Described next is the operation of the present embodiment shown in FIG. 8.

In the frequency modulation apparatus of the present embodiment, the unmodulated light L1 emitted from the light source 101 is branched by the first optical branching circuit 104 into two lights, one being supplied to the external optical modulator 102e and the other being supplied to the first optical receiver 110.

The external optical modulator 102e modulates the unmodulated light L1 from the light source 101 with the electrical signal Si from the signal source 100, generating an optical-frequency-modulated signal L1m having a center optical frequency $f_1$. The optical signal L1m is supplied to the second optical receiver 114. The first optical receiver 110 receives the unmodulated light L1 from the light source 101 and the unmodulated light L2 from the local light source 103, generating an unmodulated beat signal Sb having a frequency $f_s 32 \ |f_1-f_2|$ equal to the difference of optical frequencies between these two lights through optical heterodyne detection based on its square-law detection characteristics. The frequency converter 112 converts the frequency of the unmodulated beat signal Sb, outputting a frequency-converted signal Sx having a frequency $f_x$ to the second optical modulator 113. The second optical modulator 113 subjects the light L2 from the local light source 103 to optical modulation (amplitude or intensity modulation) with the frequency-converted signal Sx from the frequency converter 112, outputting an optical modulated signal L2x to the second optical receiver 114. The second optical receiver 114 receives the optical signal L1 from the first optical modulator 102 and the optical signal L2x from the second optical modulator 113, generating an FM signal Sfm with phase noise suppressed as a beat signal having a center frequency $f_L$ $(=f_s=f_x)$ through optical heterodyne detection based on its square-law detection characteristics.

As described above, according to the fifth embodiment, since the unmodulated beat signal Sb is outputted from the first optical receiver 110 like the fourth embodiment, the frequency modulation apparatus can generate a high-frequency, wide-band FM signal with phase noise suppressed without using the electrical filter 111. Furthermore, with the unmodulated light L1 from the light source 101 supplied to the first optical receiver 110, no optical filters are required in the fifth embodiment, unlike the fourth embodiment.

First Modified Embodiment

In the above described embodiments, the second optical modulator 113 is placed on the second optical waveguide 108, optically modulating the unmodulated light L2 emitted from the local light source 103 or the optical signal L2 outputted from the fourth optical modulator 516 with the frequency-converted signal Sx. Instead, by placing the second optical modulator 113 on the first optical waveguide 106, the optical signal L1 from the first optical modulator 102 may be optically modulated with the frequency-converted signal Sx. FIG. 9 is a block diagram showing an exemplary configuration of such frequency modulation apparatus. The frequency modulation apparatus is a modification of the first embodiment shown in FIG. 1 (hereinafter referred to as first modified embodiment), where the second optical modulator 113 placed on the second optical waveguide 108 in the first embodiment is placed on the first optical waveguide 106.

Figure 10A:
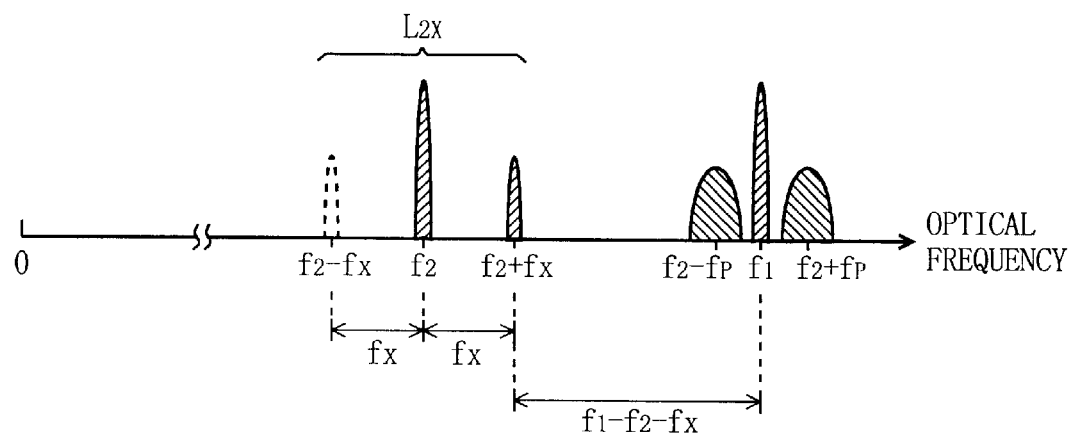
FIG. 10A is a schematic diagram showing an optical frequency spectrum of an optical signal inputted to the second optical receiver in the frequency modulation apparatus according to each the first, second, fourth, and fifth embodiments.

As typically shown in the above first embodiment, the second optical modulator 113 subjects the unmodulated light L2 having the optical frequency $f_2$ to optical amplitude or intensity modulation with the frequency-converted signal Sx having the frequency $f_x$ $(=|f_s-f_L|)$, generating an optical modulated signal L2x having an optical frequency spectrum as shown in FIG. 10A $(f_1>f_2)$.

Figure 10B:
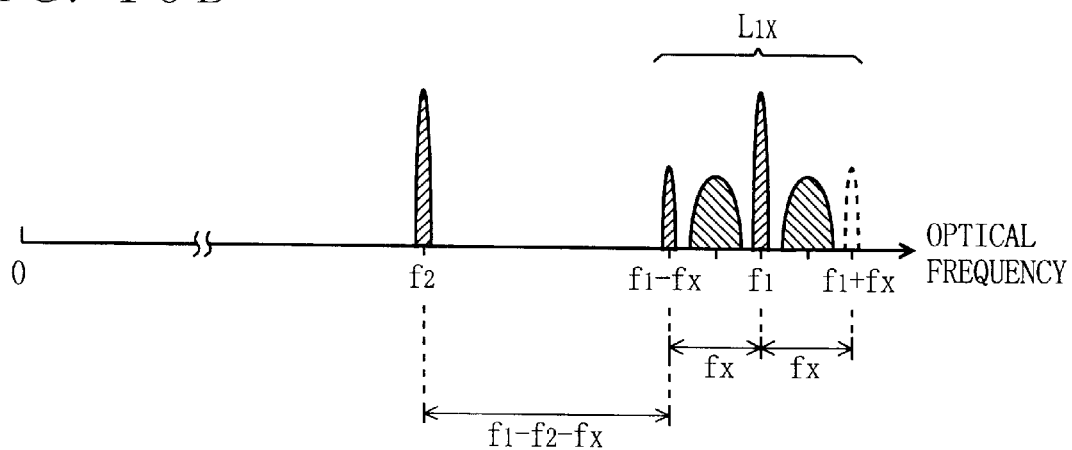
FIG. 10B is a schematic diagram showing the optical frequency spectrum of an optical signal inputted to the second optical second optical receiver in the frequency modulation apparatus according to the first modified embodiment.

On the other hand, in the frequency modulation apparatus of the first modified embodiment, the second optical modulator 113 subjects the optical signal L1 having the optical center frequency $f_1$ to optical amplitude or intensity modulation with the frequency-converted signal Sx having the frequency $f_x(=|f_s-f_L|)$, generating an optical modulated signal L1x having an optical frequency spectrum as shown in FIG. 10B $(f_1>f_2)$. The second optical receiver 114 in the first modified embodiment receives the optical modulated signal L1x and the unmodulated light L2 having the frequency $f_2$ emitted from the local light source 103, generating an FM signal Sfm as a beat signal having the center frequency $f_L$ $(=|f_s-f_x|)$ through optical heterodyne detection based on its square detection characteristics. In other words, in the first modified embodiment, the FM signal is substantially equal to the FM signal Sfm obtained in the first embodiment. Therefore, also the frequency modulation apparatus of the first modified embodiment can generate a high-frequency, wide-band FM signal with phase noise suppressed, not being affected by the phase noise from the light sources.

Second Modified Embodiment

More preferably, in the above described embodiments, the propagation time of the first light L1 being emitted from the first optical modulator 102 (more accurately, the light source such as a semiconductor laser constructing the first optical modulator 102) through the first optical waveguide 106 directly to the second optical receiver 114 and the propagation time of the first light L1 being emitted from the optical modulator 102 through the second optical waveguide 107, the first optical receiver 110, the second optical modulator 113, and other components to the second optical receiver 114 are set to be equal to each other. Furthermore, the propagation time of the second light L2 being emitted from the local light source 103 or the fourth optical modulator 516 (more accurately, the light source constructing the optical modulator 516) through the third optical waveguide 108 and the second optical modulator 113 to the second optical receiver 114 and the propagation time of the second light L2 being emitted from the local light source 103 or the fourth optical modulator 516 through the fourth optical waveguide 109, the first optical receiver 110, the second optical modulator 113, and other components to the second optical receiver 114 are set to be equal to each other.

Figure 11:
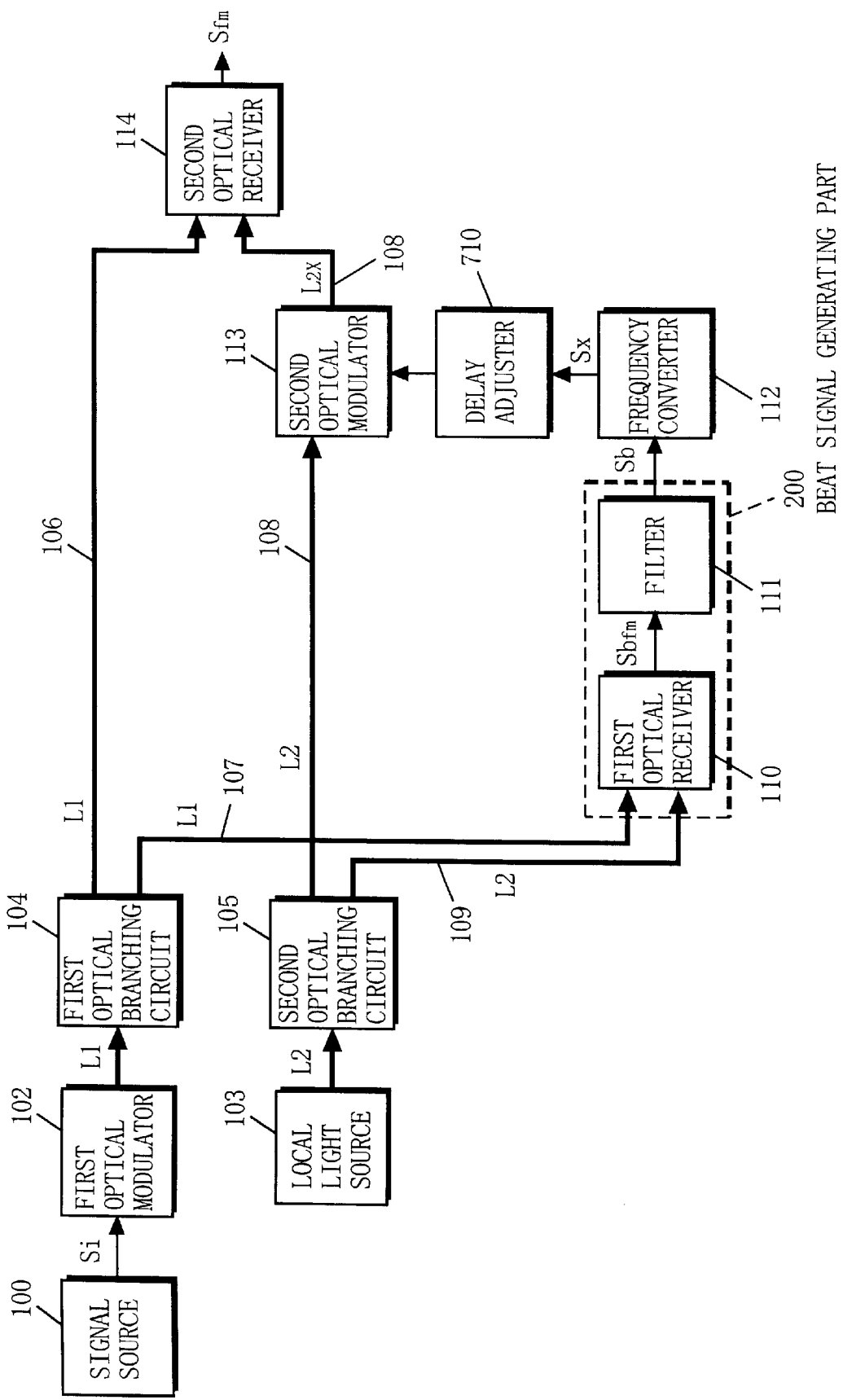
FIG. 11 is a block diagram showing the configuration of a frequency modulation apparatus according to a second modified embodiment, which is another modification of the first embodiment.

For example, to achieve the above setting, at least one delay circuit (optical or electrical) is placed on an optical path such as an optical waveguide or an electrical path forming the propagation paths of the first and second lights L1 and L2 as propagation time adjusting means. For this propagation adjusting means, electrical means is preferable to optical one in view of cost effectiveness. FIG. 11 is a block diagram showing the configuration of another modification of the first embodiment shown in FIG. 1 (hereinafter referred to as second modified embodiment). In the frequency modulation apparatus shown in FIG. 11, a delay adjuster 710 constructed of a electrical delay circuit is inserted between the frequency converter 112 and the second optical modulator 113. The inserting position of the delay adjuster 710 is not restricted to the above, but may be between the filter 111 and the frequency converter 112 or between the first optical receiver 110 and the filter 111.

By equalizing the propagation times with such propagation time adjusting part, the phase noise of the FM signal Sfm from the second optical receiver 114 can be surely suppressed, and also a high-frequency, wide-band FM signal Sfm of higher quality.can be generated.

Third and Fourth Modified Embodiments

In the second and third embodiments, the first and second or the first and third IM-DD components generated in the second optical receiver 114 are set equal in amplitude with opposite phases to each other. More specifically, to adjust the phases of these IM-DD components, the propagation time of the first electrical signal Si1 from the branching part 301, being converted into the optical signal L1 in the first optical receiver 102 until it reaches the second optical receiver 114 through the first optical waveguide 106 and the propagation time of the second electrical signal Si2 also from the branching part 301, being converted into the optical signal L3 or L2 in the third or fourth optical modulator 315 or 516 until it reaches the second optical receiver 114 through the fifth or third optical waveguide 317 or 108 are set equal. Furthermore, in the optical signal received by the second optical receiver 114, the amplitudes of the optical intensity modulation components corresponding to the first: and second or the first and third IM-DD components are set equal.

Figure 12:
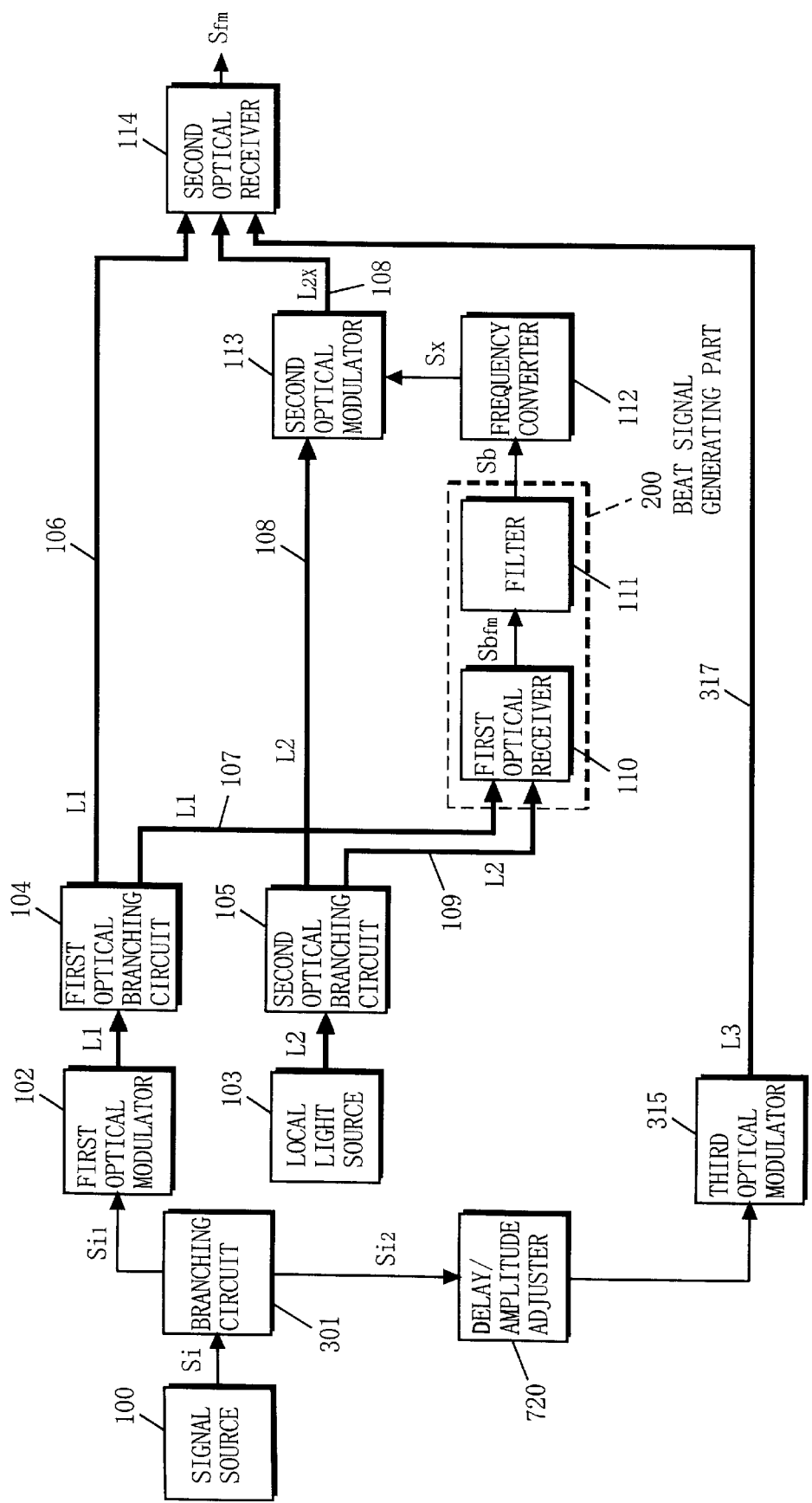
FIG. 12 is a block diagram showing the configuration of a frequency modulation apparatus according to a third modified embodiment, which is a modification of the second embodiment.
Figure 13:
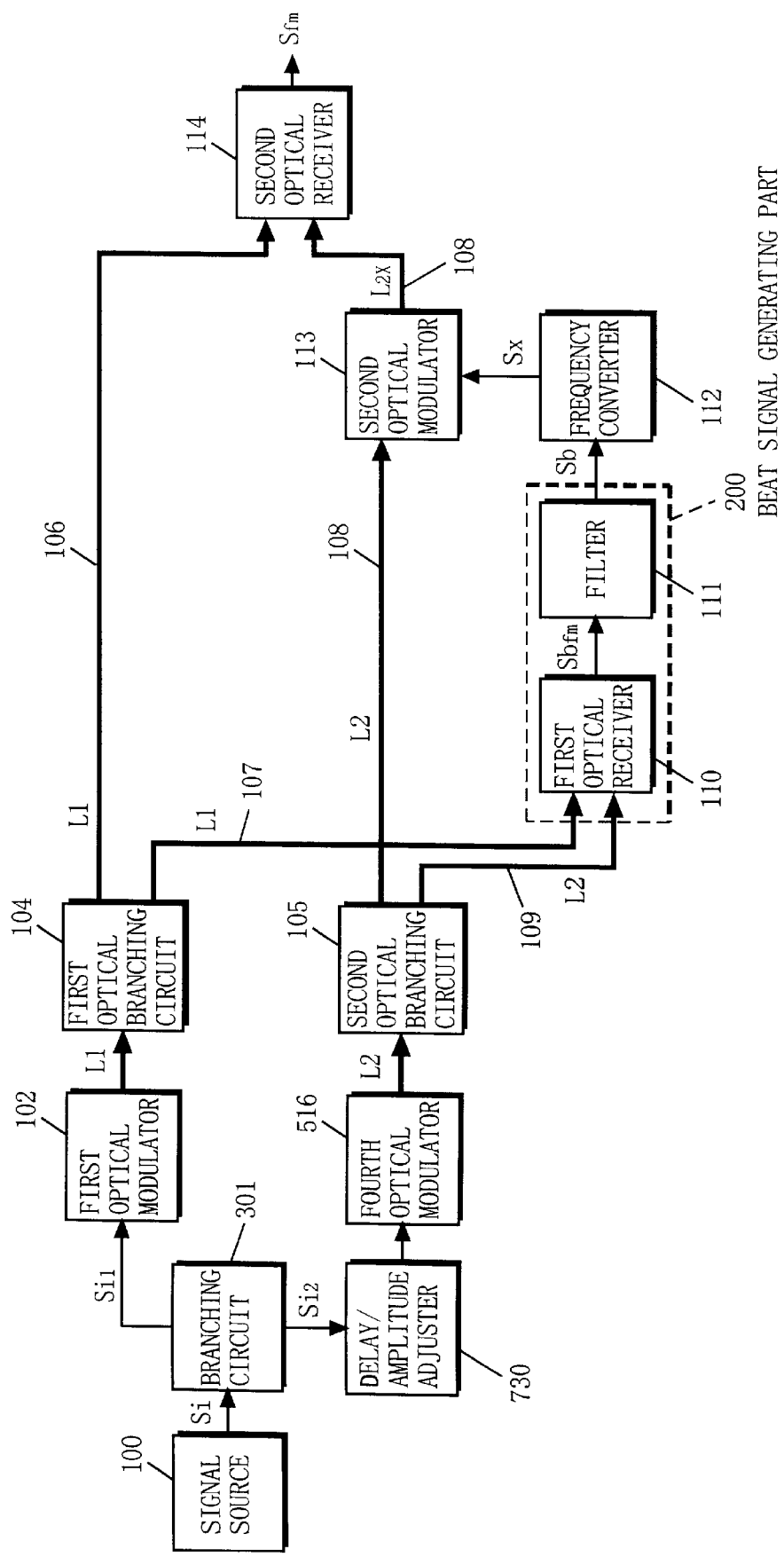
FIG. 13 is a block diagram showing the configuration of a frequency modulation apparatus according to a fourth modified embodiment, which is a modification of the third embodiment.
Figure 14:
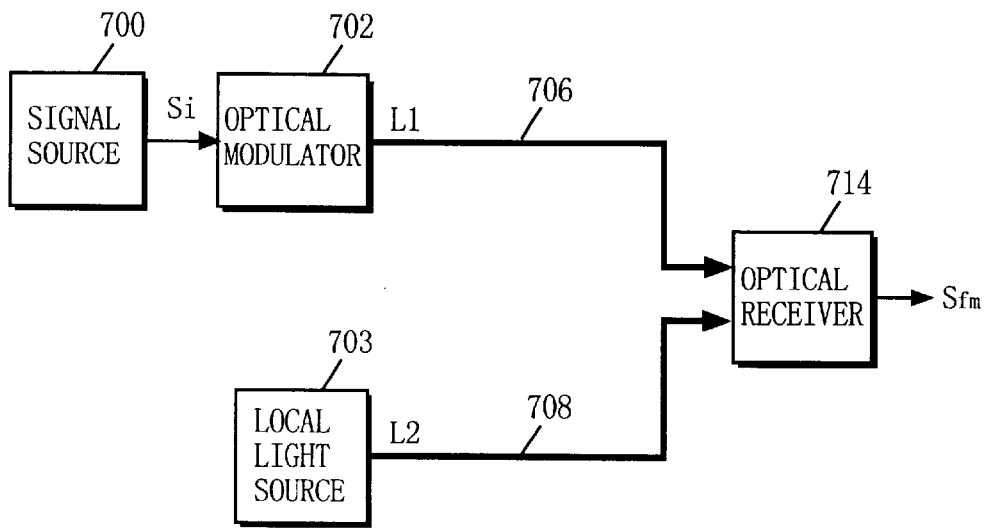
FIG. 14 is a block diagram showing the configuration of a conventional frequency modulation apparatus.
Figure 15A:
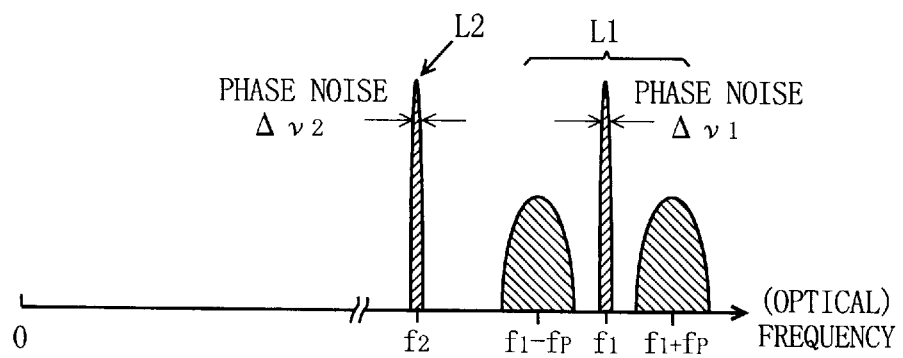
FIG. 15A is a schematic diagram showing an optical frequency spectrum of an optical signal inputted to the optical receiver in the conventional frequency modulation apparatus.
Figure 15B:
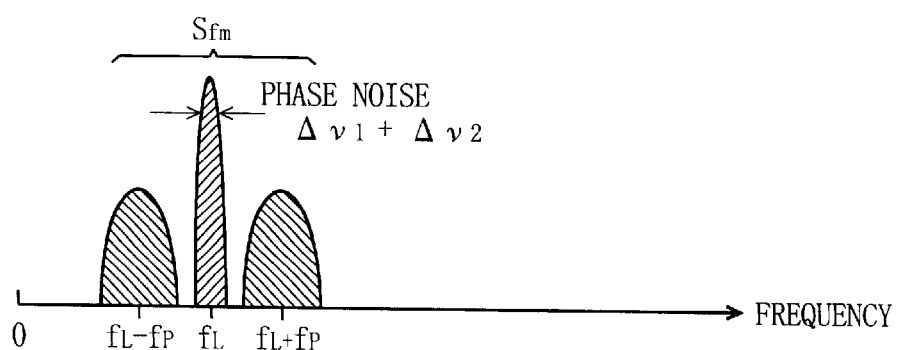
FIG. 15B is a schematic diagram showing the frequency spectrum of an output signal from the optical receiver in the conventional frequency modulation apparatus.

For example, to achieve the above setting , at least one delay circuit (optical or electrical) and a variable gain amplifier (or an attenuator) are placed on an optical path such as an optical waveguide or an electrical path forming the propagation path of the above signals, as phase/amplitude adjusting means. For this phase/amplitude adjusting means, electrical adjusting means is preferable to optical one in view of cost effectiveness. FIG. 12 is a block diagram showing the configuration of a modification of the second embodiment shown in FIG. 3 (hereinafter referred to as third modified embodiment). In the frequency modulation apparatus shown in FIG. 12, a delay/amplitude adjuster 720 constructed of an electrical delay circuit and a variable gain amplifier is inserted between the branching part 301 and the third optical modulator 315. FIG. 13 is a block diagram showing the configuration of a modification of the third embodiment shown in FIG. 5 (hereinafter referred to as fourth modified embodiment). In the frequency modulation apparatus shown in FIG. 13, a delay/amplitude adjuster 730 of the same configuration as the delay/amplitude adjuster 720 is inserted between the branching part 301 and the fourth optical modulator 516. The inserting position of the delay/amplitude adjuster 720 or 730 is not restricted to the above, but may be between the branching part 301 and the first optical modulator 102, for example.

By equalizing the phases and amplitudes with such phase/amplitude adjusting means, the IM-DD component from the second optical receiver 114 can be surely suppressed, and also a high-frequency, wide-band FM signal Sfm of higher quality can be generated.

While the invention has been described in detail, the foregoing description is in all aspects illustrative and not restrictive. It is understood that numerous other modifications and variations can be devised without departing from the scope of the invention.

What is claimed is:

1. A frequency modulation apparatus for converting an input electrical signal into an FM signal through optical frequency modulation and optical heterodyne detection using a first light source emitting first light and a second light source emitting second light, the first light and the second light having different optical frequencies from each other; the apparatus comprising:

a first optical modulator for outputting said first light frequency-modulated with said input electrical signal as a first optical signal;

a beat signal generating part for generating an unmodulated beat signal corresponding to a carrier component of a beat signal obtained from said first and second lights through optical detection based on a square-law detection characteristic;

a frequency converter for generating the frequency-converted signal by converting frequency of said unmodulated beat signal;

a second optical modulator for generating a second optical signal by optical-amplitude-modulating or optical-intensity-modulating any one of said first optical signal and said second light with said frequency-converted signal; and an optical receiver for receiving one of said first optical signal and said second light, which is not subjected to optical-amplitude-modulation or optical-intensity-modulation by said second optical modulator, and said second optical signal, and generating said FM signal through optical detection based on the square-law detection characteristic.

2. The frequency modulation apparatus according to claim 1, wherein said first optical modulator generates said first optical signal through direct modulation; and said beat signal generating part comprises a photo-detection device for receiving said first optical signal and said second light, and generating a modulated beat signal, which is a modulated electrical signal having a center frequency equal to a difference of optical frequencies between said first optical signal and said second light, through optical detection based on the square-law detection characteristic; and a filter for extracting a carrier component from said modulated beat signal, and outputting the carrier component as said unmodulated beat signal.

3. The frequency modulation apparatus according to claim 1, wherein said first optical modulator comprises said first light source for emitting said first light as being unmodulated; and an external optical modulator for generating said first optical signal by modulating said first light emitted from said first light source with said input electrical signal;

said second light source emits second light as being unmodulated; and said beat signal generating part comprises a photo-detection device for receiving said first and second lights, and generating said unmodulated beat signal through optical detection based on the square-law detection characteristic.

4. The frequency modulation apparatus according to claim 1, wherein said first optical modulator generates said first optical signal having a predetermined center frequency $f_1$ by uniquely converting an amplitude variation of said input electrical signal into an optical frequency variation of said first light, said second light source emits light having a predetermined frequency $f_2$ as said second light, said beat signal generating part comprises a photo-detection device for receiving said first optical signal and said second light, and generating a modulated beat signal, which is a modulated electrical signal, at a frequency $f_s=|f_1-f_2|$ equal to a difference of optical frequencies between said first optical signal and said second light through the optical detection based on the square-law detection characteristic; and a filter for extracting a carrier component from said modulated beat signal, and outputting the carrier component as said unmodulated beat signal, said frequency converter converts said unmodulated beat signal into a signal having a predetermined frequency $f_x$ and outputting the converted signal as said frequency-converted signal, said second optical modulator generates a second optical signal by optical-amplitude-modulating or optical-intensity-modulating any one of said first optical signal and said second light with said frequency-converted signal having the frequency $f_x$, and said optical receiver receives one of said first optical signal and said second light, which is not subjected to optical-amplitude-modulation or optical-intensity-modulation by said second optical modulator, and said second optical signal, generating said FM signal at a frequency $f_L=|f_s-f_x|$ through optical detection based on the square-law detection characteristic.

5. The frequency modulation apparatus according to claim 1, further comprising:

a branching circuit for branching said input electrical signal into first and second electrical signals of opposite phase; and a third optical modulator for converting said second electrical signal into a third optical signal through optical intensity modulation, wherein said first optical modulator generates said first optical signal having a predetermined center frequency $f_1$ by uniquely converting an amplitude variation of said first electrical signal into an optical frequency variation of said first light through direct modulation, said second light source emits light having a predetermined frequency $f_2$ as said second light, said beat signal generating part comprises:

a photo-detection device for receiving said first optical signal and said second light, and generating a modulated beat signal, which is a modulated electrical signal, at a frequency $f_s=|f_1=f_2|$ equal to a difference of optical frequencies between said first optical signal and said second light through optical detection based on the square-law detection characteristic; and a filter for extracting a carrier component from said modulated beat signal, and outputting the carrier component as said unmodulated beat signal, said frequency converter converts said unmodulated beat signal into a signal having a predetermined frequency $f_x$, and outputs the signal as said frequency-converted signal, said second optical modulator generates a second optical signal by optical-amplitude-modulating or optical-intensity-modulating any one of said first optical signal and said second light with said frequency-converted signal having the frequency $f_x$, and said optical receiver receives one of said first optical signal and said second light, which is not subjected to optical-amplitude-modulation or optical-intensity-modulation by said second optical modulator, and said second optical signal, generating said FM signal at a frequency $f_L=|f_s-f_x|$ through said optical detection based on the square-law detection characteristic, and also receives said third optical signal, generating an electrical signal corresponding to an optical-intensity-modulated component included in said third optical signal through said optical detection.

6. The frequency modulation apparatus according to claim 5, further comprising a phase/amplitude adjusting part for adjusting a first IM-DD component and a second IM-DD component to have opposite phases and a same amplitude, said first IM-DD component corresponding to an optical-intensity-modulated component included in said first optical signal and said second IM-DD component corresponding to an optical-intensity-modulated component included in said third optical signal, said first and second IM-DD components being generated by said optical receiver through optical detection based on said square-law detection characteristic.

7. The frequency modulation apparatus according to claim 1, further comprising:

a branching circuit for branching said input electrical signal into the first and second electrical signals having opposite phases to each other; and a fourth optical modulator for outputting said second light, which is a modulated light having a predetermined center frequency $f_2$, as a fourth optical signal, wherein said first optical modulator generates said first optical signal having a predetermined center frequency $f_1$ by uniquely converting an amplitude variation of said first electrical signal into an optical frequency variation of said first light through direct modulation, said fourth optical modulator generates said fourth optical signal having the predetermined center frequency $f_2$ by uniquely converting an amplitude variation of said second electrical signal into an optical frequency variation of said second light by direct modulation, said beat signal generating part comprises:

a photo-detection device for receiving said first and fourth optical signals, and generating a modulated electrical beat signal at a frequency $f_s=|f_1-f_2|$ equal to a difference of optical frequencies between said first and fourth optical signals through optical detection based on the square-law detection characteristic; and a filter for extracting a carrier component from said modulated beat signal, and outputting the carrier component as said unmodulated beat signal, said frequency converter converts said unmodulated beat signal into a signal having a predetermined frequency $f_x$, and outputs the converted signal as said frequency-converted signal, the second optical modulator generates the second optical signal by optical-amplitude-modulating or optical-intensity-modulating any one of said first and fourth optical signals with said frequency-converted signal, and the optical receiver receives one of said first and fourth optical signals, which is not subjected to optical-amplitude-modulation or optical-intensity-modulation by said second optical modulator, and the second optical signal, generating the FM signal at a frequency $f_L=|f_s-f_x|$ through optical detection based on the square-law detection characteristic.

8. The frequency modulation apparatus according to claim 7, further comprising a phase/amplitude adjusting part, for adjusting a first IM-DD component and a third IM-DD component to have opposite phases and a same amplitude, said first IM-DD component corresponding to an optical-intensity-modulated component included in said first optical signal and said third IM-DD component corresponding to an optical-intensity-modulated component included in said fourth optical signal, said first-and third IM-DD components being generated by said optical receiver through optical detection based on said square-law detection characteristic.

9. The frequency modulation apparatus according to claim 1, further comprising an optical filter inserted between said first optical modulator and said beat signal generating part, said optical filter extracting an optical carrier component from said first optical signal, wherein said second light source emits unmodulated light as said second light, and said beat signal generating part comprises a photodetection device for receiving the optical carrier component extracted by said optical filter and said second light, and generating said unmodulated beat signal through optical detection based on the square-law detection characteristic.

10. The frequency modulation apparatus according to claim 1, further comprising:

a branching circuit for branching said input electrical signal into first and second electrical signals having opposite phases to each other;

a fourth optical modulator for outputting said second light, which is a modulated light having a predetermined center frequency $f_2$, as a fourth optical signal;

a first optical filter inserted between said first optical modulator and said beat signal generating part; and a second optical filter inserted between said fourth optical modulator and said beat signal generating part, wherein said first optical modulator generates said first optical signal having a predetermined center frequency $f_1$ by uniquely converting an amplitude variation of said first electrical signal into an optical frequency variation of said first light through direct modulation, said fourth optical modulator generates said fourth optical signal having the predetermined center frequency $f_2$ by uniquely converting an amplitude variation of said second electrical signal into an optical frequency variation of said second light through direct modulation, said first optical filter extracts an optical carrier component from said first optical signal, said second optical filter extracts an optical carrier component from said fourth optical signal, said beat signal generating part comprises a photodetection device for receiving the optical carrier components extracted by said first and second optical filter, and generating said unmodulated beat signal at a frequency $f_s=|f_1-f_2|$ corresponding to a difference of optical frequencies between the optical carrier components through optical detection based on the square-law detection characteristic, said frequency converter converts said unmodulated beat signal into a signal having a predetermined frequency $f_x$, and outputs the converted signal as said frequency-converted signal, said second optical modulator generates the second optical signal by optical-amplitude-modulating or optical-intensity-modulating any one of said first and fourth optical signals with said frequency-converted signal having the frequency $f_x$, and said optical receiver receives one of said first and fourth optical signals, which is not subjected to optical-amplitude-modulation or optical-intensity-modulation by said second optical modulator, and said second optical signal, generating said FM signal at a frequency $f_L=|f_s f_x|$ through optical detection based on the square-law detection characteristic.

11. The frequency modulation apparatus according to claim 10, further comprising phase/amplitude adjusting means for adjusting a first IM-DD component and a third IM-DD component to have opposite phases and a same amplitude, said first IM-DD component corresponding to an optical-intensity-modulated component included in said first optical signal and said third IM-DD component corresponding to an optical-intensity-modulated component included in said fourth optical signal, said first and third IM-DD components being generated by said optical receiver through optical detection based on said square-law detection characteristic.

12. The frequency modulation apparatus according to claim 1, further comprising:

first propagation time adjusting means for equalizing an optical and electrical propagation time in a path from said first light source through said beat signal generating part to said optical receiver and an optical propagation time in a path from said first light source directly to said optical receiver; and second propagation time adjusting means for equalizing an optical and electrical propagation time in a path from said second light source through said beat signal generating part to said optical receiver and an optical propagation time in a path from said second light source directly to said optical receiver.

* * * * *

UNITED STATES PATENT AND TRADEMARK OFFICE
CERTIFICATE OF CORRECTION

PATENT NO. : 6,512,619 B1
DATED : January 28, 2003
INVENTOR(S) : Masaru Fuse et al.

It is certified that error appears in the above-identified patent and that said Letters Patent is hereby corrected as shown below:

<u>Title page,</u>
Item [57], ABSTRACT,
Line 6, delete "," after "This".

<u>Column 25,</u>
Line 45, change "$f_s = |f_1 = f_2|$" to -- $f_s = |f_1 - f_2|$ --.

<u>Column 28,</u>
Line 23, change "$f_L = |f_s f_x|$" to -- $f_L = |f_s - f_x|$ --.

Signed and Sealed this

Twenty-second Day of July, 2003

JAMES E. ROGAN
*Director of the United States Patent and Trademark Office*